(12) United States Patent
Langlois et al.

(10) Patent No.: US 12,705,714 B2
(45) Date of Patent: Aug. 11, 2026

(54) JITTER CORRECTION IMAGE ANALYSIS

(71) Applicant: Illumina, Inc., San Diego, CA (US)

(72) Inventors: Robert Ezra Langlois, San Diego, CA (US); Hongji Ren, San Diego, CA (US); Mohamed Khaled Mohamed Geunady, San Diego, CA (US); John S. Vieceli, Encinitas, CA (US); Gregory Holst, San Diego, CA (US); Paul Sangiorgio, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 225 days.

(21) Appl. No.: 18/405,320

(22) Filed: Jan. 5, 2024

(65) Prior Publication Data

US 2024/0257320 A1 Aug. 1, 2024

Related U.S. Application Data

(60) Provisional application No. 63/441,606, filed on Jan. 27, 2023.

(51) Int. Cl.
*G06T 5/80* (2024.01)
*G06T 3/02* (2024.01)
(Continued)

(52) U.S. Cl.
CPC .................. *G06T 5/80* (2024.01); *G06T 3/02* (2024.01); *G06T 7/74* (2017.01); *G06T 2207/30072* (2013.01)

(58) Field of Classification Search
USPC .......................................................... 382/128
See application file for complete search history.

(56) References Cited

U.S. PATENT DOCUMENTS 6,278,483 B1 * 8/2001 Sartor .................. H04N 1/0408 348/94
8,158,926 B2 4/2012 Feng et al.
(Continued)

FOREIGN PATENT DOCUMENTS

WO WO-2022061150 A2 * 3/2022 ............... G06T 7/33

OTHER PUBLICATIONS

Bittihn, et al., "Genetically Engineered Control of Phenotypic Structure in Microbial Colonies", Nature Microbiology, vol. 5, No. 5, May 2020, pp. 697-705.
(Continued)

*Primary Examiner* — Chineyere Wills-Burns
*Assistant Examiner* — Bezawit Nolawi Shimeles
(74) *Attorney, Agent, or Firm* — Flaster Greenberg P.C.

(57) ABSTRACT

Systems, methods, and apparatuses are described herein. For instance, a detection apparatus may comprise memory and at least one processor. The detection apparatus may be configured to obtain an image comprising at least one feature and a plurality of fiducials. The plurality of fiducials may be arranged in a pattern. The detection apparatus may be configured to determine a plurality of sub-regions of the image. Each sub-region comprises a subset of the fiducials comprised in the image. The detection apparatus may be configured to perform a geometric transform on each sub-region to generate a respective local transform associated with each sub-region. The detection apparatus may be configured to register respective locations of the fiducials comprised in the image based on the respective local transform associated with each sub-region. A size of each sub-region may be selected such that each sub-region is substantially invariant to stage jitter.

28 Claims, 16 Drawing Sheets

(51) Int. Cl.

| | |
|---|---|
| ***G06T 5/73*** | (2024.01) |
| ***G06T 7/33*** | (2017.01) |
| ***G06T 7/73*** | (2017.01) |

(56) References Cited

U.S. PATENT DOCUMENTS

| | | | | |
|---|---|---|---|---|
| 8,241,573 | B2 | 8/2012 | Banerjee et al. | |
| 8,778,848 | B2 | 7/2014 | Lin et al. | |
| 9,512,422 | B2 | 12/2016 | Barnard et al. | |
| 9,905,005 | B2 * | 2/2018 | Fu | G01N 21/6456 |
| 11,262,307 | B2 | 3/2022 | Vieceli et al. | |
| 11,308,640 | B2 | 4/2022 | Vieceli et al. | |
| 2011/0059865 | A1 | 3/2011 | Smith et al. | |
| 2012/0020537 | A1 | 1/2012 | Garcia et al. | |
| 2012/0270305 | A1 | 10/2012 | Reed et al. | |
| 2013/0023422 | A1 | 1/2013 | Feng et al. | |
| 2013/0260372 | A1 | 10/2013 | Buermann et al. | |
| 2016/0196653 | A1 * | 7/2016 | Grant | H04N 23/45 382/294 |
| 2017/0281135 | A1 * | 10/2017 | Leong | G06T 3/14 |
| 2021/0049347 | A1 * | 2/2021 | Zhao | G06V 40/171 |
| 2021/0155982 | A1 | 5/2021 | Yin et al. | |
| 2021/0158522 | A1 * | 5/2021 | Weisenfeld | G06T 7/136 |
| 2021/0166396 | A1 * | 6/2021 | Chen | G06T 7/74 |
| 2021/0374370 | A1 * | 12/2021 | Opalsky | B01L 3/545 |
| 2022/0049294 | A1 * | 2/2022 | Uytingco | C12Q 1/6837 |
| 2022/0292796 | A1 * | 9/2022 | Xu | G06T 7/73 |
| 2022/0412872 | A1 | 12/2022 | Nareid | |
| 2022/0414853 | A1 * | 12/2022 | Vieceli | B01J 19/0046 |

OTHER PUBLICATIONS

Hoffecker, et al., "A Computational Framework for DNA Sequencing Microscopy", Proceedings of the National Academy of Sciences of the United States of America, vol. 116, No. 39, Sep. 24, 2019, pp. 19282-19287.

* cited by examiner

| | R1 | | | | R2 | | | |
|---|---|---|---|---|---|---|---|---|
| | PF% | Error Rate | Q30 | Yield G | PF% | Error Rate | Q30 | Yield G |
| %Change (mean) | 0.01% | - 8.00% | 0.24% | - 0.08% | 0.02% | - 6.37% | 0.40% | - 0.1% |
| Hawaii-1 | 0.24% | - 8.81% | 0.41% | 0.29% | 0.24% | - 6.27% | 0.68% | 0.31% |
| Hawaii-2 | - 0.07% | - 9.76% | 0.44% | -0.32% | - 0.07% | - 0.97% | 0.56% | -0.28% |
| Faroe-1 | - 0.23% | - 2.69% | 0.10% | - 0.33% | - 0.23% | - 0.35% | - 0.01% | - 0.28% |
| Faroe-2 | 0.36% | - 5.56% | 0.35% | 0.27% | 0.36% | - 4.47% | 0.40% | 0.24% |
| Galapagos | - 0.20% | - 17.19% | 0.19% | - 0.33% | - 0.20% | - 19.80% | 0.35% | - 0.49% |
| Caspian-1 | - 0.03% | - 3.90% | 0.41% | - 0.04 | | | | |

FIG. 7B

JITTER CORRECTION IMAGE ANALYSIS

CROSS REFERENCE TO RELATED APPLICATIONS

This application claims the benefit of U.S. Provisional Patent Application No. 63/441,606, filed Jan. 27, 2023, which is incorporated herein by reference in its entirety.

BACKGROUND

In recent years, biotechnology firms and research institutions have improved hardware and software platforms to determine a sequence of nucleotide bases (or whole genome) and identify variant calls for nucleotide bases that differ from reference bases of a reference genome. Many of these platforms utilize image detection systems to capture and decompose sequencing images of the nucleotide bases through use of, for example, line scanning and confocal control of imaging optics. However, high frequency motion of a stage (i.e., jitter) on the line scanning system typically induces non-linear perturbations of cluster locations within a sequencing image, thereby negatively impacting data quality. Stage jitter may perturb the position of spots corresponding to a cluster of deoxyribonucleic acid (DNA) molecules within a well on a flow cell with respect to fiducials of the sequencing image. Additionally, stage jitter may also perturb fiducials. As such, spot locations may be inaccurate. For example, FIG. 9 is an example heatmap illustrating stage jitter present in both the X and Y directions of a tile 900 during a conventional imaging cycle. The top plot 904*a* illustrates movement of a fiducial 902 in an X-direction 908, in which the area 906 of the heatmap illustrates movement of the fiducial 902 caused by stage jitter. The bottom plot 904*b* illustrates movement of the fiducial 902 in a Y-direction 912, in which the area 910 of the heatmap illustrates movement of the fiducial 902 caused by stage jitter.

SUMMARY

Systems and methods are described for image recognition and/or image processing that account for and correct errors introduced due to high frequency jitter in an image capturing device. For example, an image detection device may correct high frequency motions (i.e., jitter) of a stage that leads to inconsistent movement of locations of spots within an image. A spot may correspond to clusters of DNA molecules within a well of a flow cell. The image detection device may obtain an image of an object (e.g., the flow cell) that has a plurality of fiducials arranged in a pattern. Examples of fiducial patterns may include a set of four fiducials linearly arranged adjacent to another set of four fiducials. Another exemplary fiducial pattern may include a set of nine fiducials linearly arranged adjacent to another set of nine fiducials, in which a set of two fiducials are centrally disposed between the first and second set of nine fiducials. The image detection device may generate locations of the fiducials and decompose the image into sub-regions, such that each sub-region includes a subset of fiducials. The image detection device may construct a size of each sub-region such that each sub-region is substantially invariant to stage jitter. The image detection device may perform a transformation on each sub-region (i.e., an affine transform) to generate an arrangement of the fiducials within each sub-region (e.g., matrices of the affine transform performed on each sub-region). Based on the generated arrangement of fiducials, the image detection device may determine the locations of the spots of the flow cell. That is, the image detection device may use each determined matrices to register respective locations of the fiducials while accounting for jitter and determining the positioning of the location of spots within the image.

In another example, a sequencing system may obtain an image including at least one feature and a plurality of fiducials. The plurality of fiducials may be arranged in a pattern. The sequencing system may determine a plurality of sub-regions of the image. Each sub-region may include a subset of the fiducials included in the image. The sequencing system may perform a geometric transform on each sub-region to generate a respective local transform associated with each sub-region. The sequencing system may register respective locations of the fiducials comprised in the image based on the respective local transform associated with each sub-region. In an example, a size of each sub-region is selected such that each sub-region is substantially invariant to stage jitter. In one or more cases, the sequencing system may determine a respective location for each of the fiducials in the image based on a determined location of a reference fiducial. Further, the sequencing system may generate a sub-image based on the obtained image. In an example, the sub-image includes a padding of pixels having a larger area of the reference fiducial included in the image. Having generated a sub-image based on the obtained image, the sequencing system may determine a correlation between the obtained image and the sub-image. Further, the sequencing system may determine whether to adjust a location of the reference fiducial based on the determined correlation. In one or more cases, each subset of fiducials included in a sub-region may include at least three fiducials. In one or more cases, the sub-regions may be linearly arranged with one another. In one or more cases, the geometric transform comprises an affine transform.

In another example, a sequencing method may include obtaining an image including at least one feature and a plurality of fiducials. The plurality of fiducials may be arranged in a pattern. The sequencing method may include determining a plurality of sub-regions of the image. Each sub-region includes a subset of the fiducials included in the image. The sequencing method may include performing a geometric transform on each sub-region to generate a respective local transform associated with each sub-region. The sequencing method may include registering respective locations of the fiducials included in the image based on the respective local transform associated with each sub-region. In an example, a size of each sub-region is selected such that each sub-region is substantially invariant to stage jitter. In one or more cases, the sub-regions are linearly arranged with one another. In one or more cases, each subset of fiducials included in a sub-region includes at least three fiducials. In one or more cases, a reference fiducial is located within the image, and the sequencing method includes determining a respective location for each of the fiducials in the image based on a determined location of the reference fiducial. In one or more cases, the sequencing method includes generating a sub-image based on the obtained image. In an example, the sub-image includes a padding of pixels having a larger area of the reference fiducial include in the image. In one or more cases, the sequencing method includes determining a correlation between the obtained image and the sub-image. In one or more cases, the sequencing method includes determining whether to adjust a location of the reference fiducial based on the determined correlation. In an example, a size of each sub-region is selected such that each sub-region is substantially invariant to stage jitter of approximately 200 Hz or less. In an example, at least one fiducial is associated with two adjacent sub-regions. In an example, the pattern of the plurality of fiducials includes a first set of linearly arranged fiducials that are adjacent to a second set of linearly arranged fiducials. Further, the first set of linearly arranged fiducials and the second set of linearly arranged fiducials extend substantially parallel to one another. In an example, the image includes a sequencing image. In an example, the location of the feature is associated with a well location of a flow cell. In an example, each sub-region includes a respective feature. Further, the respective local transform associated with the sub-region that includes the respective feature is used to determine the location of the respective feature.

In another example, a computer readable medium may include computer readable instructions that, when executed by a processor, cause the processor to implement a sequencing method. In one or more cases, the sequencing method includes obtaining an image including at least one feature and a plurality of fiducials. In an example, the plurality of fiducials may be arranged in a pattern. In one or more cases, the sequencing method includes determining a plurality of sub-regions of the image. In an example, each sub-region includes a subset of the fiducials included in the image. In one or more cases, the sequencing method includes performing a geometric transform on each sub-region to generate a respective local transform associated with each sub-region. In one or more cases, the sequencing method includes registering respective locations of the fiducials included in the image based on the respective local transform associated with each sub-region. In an example, a size of each sub-region is selected such that each sub-region is substantially invariant to stage jitter. In an example, the sub-regions are linearly arranged with one another. In an example, each subset of fiducials included in a sub-region includes at least three fiducials. In an example, a reference fiducial is located within the image, and a location of the reference fiducial is used to determine a respective location for each of the fiducials in the image. In one or more cases, the sequencing method includes generating a sub-image based on the obtained image. In an example, the sub-image includes a padding of pixels having a larger area of the reference fiducial included in the image. Further, in one or more cases, the sequencing method includes determining a correlation between the obtained image and the sub-image. Additionally, in one or more cases, the sequencing method includes determining whether to adjust a location of the reference fiducial based on the determined correlation. In an example, a size of each sub-region is selected such that each sub-region is substantially invariant to stage jitter of approximately 200 Hz or less. In an example, at least one fiducial is associated with two adjacent sub-regions. In an example, the pattern of the plurality of fiducials includes a first set of linearly arranged fiducials that are adjacent to a second set of linearly arranged fiducials. Further, the first set of linearly arranged fiducials and the second set of linearly arranged fiducials extend substantially parallel to one another. In an example, the image includes a sequencing image. In an example, the location of the feature is associated with a well location of a flow cell. In an example, each sub-region includes a respective feature, and the respective local transform associated with the sub-region that includes the respective feature is used to determine the location of the respective feature.

BRIEF DESCRIPTION OF THE DRAWINGS

FIGS. 5A and 5B illustrate an example transformation of a plurality of example sub-regions of an example image.

FIGS. 7A-7D illustrate performance metrics of an example imaging process to correct jitter.

DETAILED DESCRIPTION

Figure 1A:
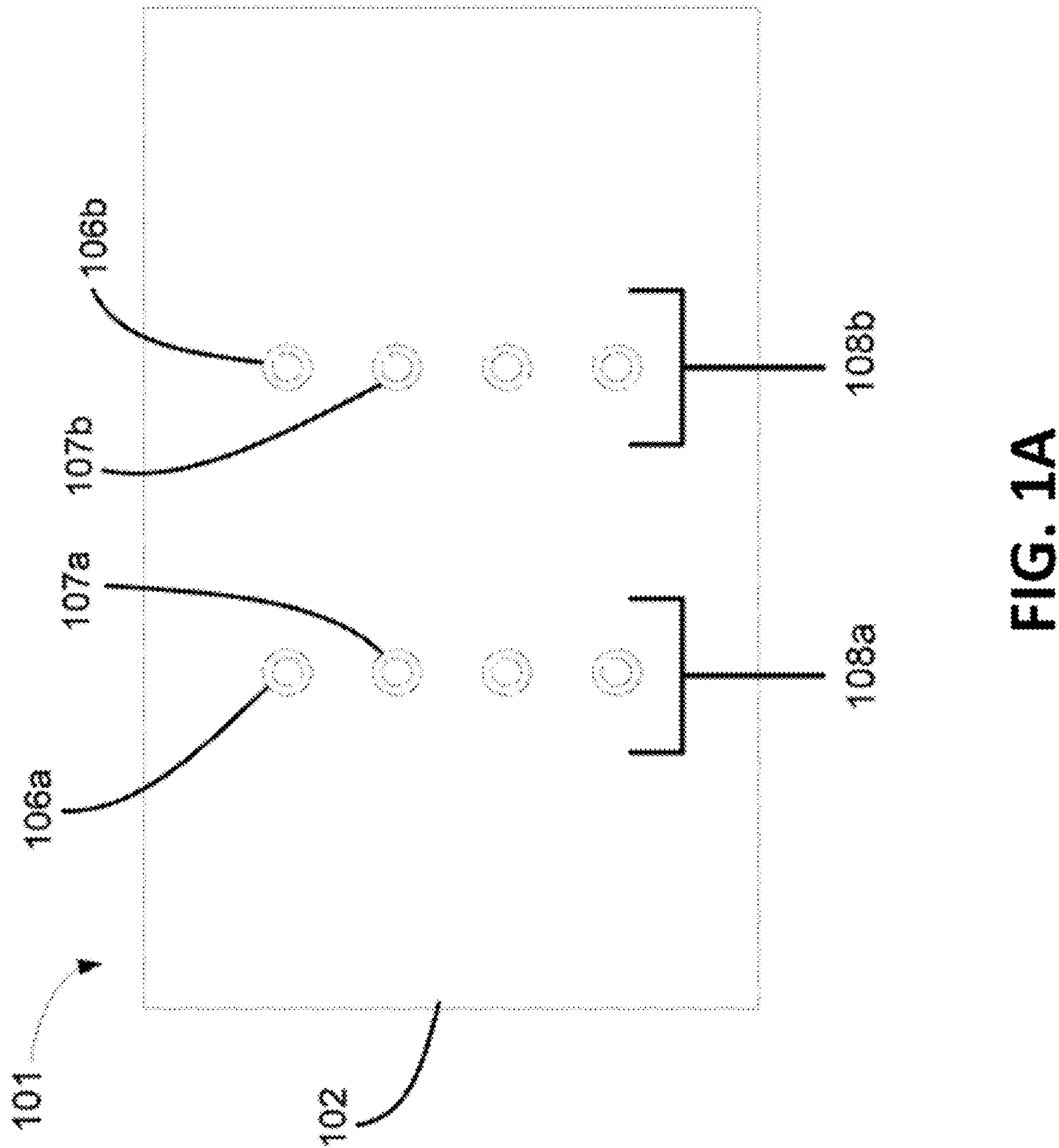
FIG. 1A-1C illustrate example fiducial arrangements of example sequencing images.

This disclosure is directed to processing image data and correcting image distortion during imaging of a patterned array having a plurality of repeating spots or fiducials. The processing of the patterned arrays produces image data (or any other form of detection output of sites on the array) of analytical arrays, such as those used for the analysis of biological samples. Biological sample analysis may include, for example, but not limited to, nucleic acid analysis, protein analysis, cell analysis, and/or the like. Arrays may contain repeating patterns of features that are to be resolved at low-micron or sub-micron resolution ranges. Although the systems, apparatus, and methods set forth herein may be described with respect to analyzing regular patterns of features, it should be understood that they can be used for random distributions of features as well.

It is noted that as used herein, a "patterned array" may include, but is not limited to, a sequencing array formed as a patterned flow cell. Such arrays include wells at which analytes may be located for processing and analysis. The wells may be disposed in a repeating pattern, a non-repeating pattern, or in a random arrangement on one or more surfaces of a substrate (e.g., a flow cell). For simplicity, all such devices are referred to and should be understood as included in the terms "patterned array" or "array".

The systems, apparatus, and methods described herein are robust to changes in characteristics of the features in the pattern or layout of the wells. The changes may manifest as different signal properties detected for one or more features in different images. For example, in a nucleic acid sequencing technique, an array of nucleic acids is subjected to several cycles of biochemical processing and imaging (e.g., a sequencing run). In some examples, each cycle may result in one of four different labels being detected at each feature, based on the nucleotide base that is processed biochemically in that cycle. In such examples, multiple (e.g., four) different images are obtained at a given cycle and each feature may be detected in the images. In an example, alignment of the images for a given cycle presents unique challenges since features that are detected in one image may appear dark in the other images. Furthermore, sequencing includes multiple cycles, and alignment of features represented in image data from successive cycles is used to determine the sequence of nucleotides at each well based on the sequence of labels detected at the respective well. Improper registration of the images within a cycle or improper registration of images across different cycles may adversely affect sequence analysis. For example, methods that employ regular patterns may be susceptible to walk-off errors during image analysis. In one example, a walk-off error occurs when two overlaid images are offset by one or more repeat units of the pattern, such that the patterns appear to overlap but features that are neighbors in the different patterns are improperly correlated in the overlay.

The terms "spot" or "feature", which are used interchangeably herein, may refer to a point or area in a pattern that can be distinguished from other points or areas according to relative location. An individual feature may include one or more molecules of a particular type. For example, a feature can include a single target nucleic acid molecule having a particular sequence. In another example, a feature can include several nucleic acid molecules having the same sequence (and/or complementary sequence, thereof). Different molecules that are at different features of a pattern can be differentiated from each other according to the locations of the features in the pattern. Features may include, for example, but not limited to, wells in a substrate (e.g., a flow cell), cluster(s) within a well of a substrate (e.g., a flow cell), projections from a substrate, ridges on a substrate, pads of gel material on a substrate, channels in a substrate, and the like.

The term "fiducial" may refer to a distinguishable point of reference in or on an object. The point of reference can be, for example, but not limited to, a mark, second object, shape, edge, area, irregularity, channel, pit, post, and/or the like. The point of reference may be present in an image of the object or in another data set derived from detecting the object. The point of reference may be specified by an X coordinate and/or Y coordinate in a plane of the object. Alternatively or additionally, the point of reference may be specified by a Z coordinate that is orthogonal to the X-Y plane. For example, the point of reference may be specified by a Z coordinate being defined by the relative locations of the object and a detector. In one or more cases, one or more coordinates for a point of reference may be specified relative to one or more other features of an object or of an image or other data set derived from the object.

The term "cluster" may refer to a collection of DNA molecules. In a patterned flow cell, the cluster may be located within a well of the flow cell.

The term "footprint" may refer to a perimeter of an object, fiducial, feature or other thing in a plane. For example, a footprint may be defined by coordinates in an X-Y plane orthogonal to a detector that observes the plane. A footprint can be characterized by shape (e.g., circular, square, rectangular, triangular, polyhedral, oval, etc.) and/or by area (e.g., at least 1 $\mu m^2$, $\mu m^2$, 10 $\mu m^2$, 100 $\mu m^2$, 1000 $\mu m^2$, 1 $mm^2$, etc.).

The term "image" may refer to a representation of all or part of an object (e.g., a sample). The representation may be an optically detected reproduction. For example, an image can be obtained from fluorescence, luminescence, scatter signal(s), absorption signal(s), and/or the like. The image may include any optical data set that is usable to obtain information about the objects (e.g., features and/or fiducials) within a defined area. A part of the object that is present in an image can be the surface or other X-Y plane of the object. An image is a 2-dimensional (2D) representation, but in some cases information in the image may be derived from 3 dimensions (3D). An image need not include optically detected signals. Alternatively, non-optical signals can be present instead. An image can be provided in a computer readable format or medium such as one or more of those as described herein.

The term "tile" may refer to one or more images of the same region of a sample. For example, each of one or more images may represent a respective color channel. A tile may form an imaging data subset of an imaging data set of one imaging cycle.

The term "optical signal" may refer to, for example, fluorescent, luminescent, scatter, or absorption signals. Optical signals can be detected in the ultraviolet (UV) range (about 200 to 390 nm), visible (VIS) range (about 391 to 770 nm), infrared (IR) range (about 0.771 to 25 microns), or other range of the electromagnetic spectrum. Optical signals can be detected in a way that excludes all or part of one or more of these ranges, for example, depending on the features of interest.

The term "location data" may refer to information pertaining to the relative locations of two or more things. For example, the information may pertain to the relative locations of at least one fiducial and an object upon which it occurs, the relative locations of at least one fiducial on an object and at least one feature on the object, the relative locations of two or more features on an object, the relative locations of a detector and an object, the relative locations of two or more parts of a fiducial, or the like. The information may be comprised in any of a variety of formats that indicate relative locations including, but not limited to, numerical coordinates, pixel identities, an image, and/or the like. Location data may be provided in a computer readable format or medium such as one or more of those described herein.

The term "repeating pattern" may refer to the relative locations of a subset of features in one region of the object is the same as the relative locations of a subset of features in at least one other region of the object. In one or more cases, one region may be adjacent to the other region in the pattern. The relative locations for features in one region of a repeating pattern may be predicted from the relative locations of features in another region of the repeating pattern. The subset of features used to the measure may include at least 2 features but can include at least, 3, 4, 5, 6, 10 or more features. Alternatively or additionally, the subset features used to the measure may include no more than 2, 3, 4, 5, 6, or 10 features. In some cases, a repeating pattern may include multiple repetitions of a sub-pattern.

The term "signal level" may refer to an amount or quantity of detected energy or coded information that has a desired or predefined characteristic. For example, an optical signal can be quantified by one or more of intensity, wavelength, energy, frequency, power, luminance or the like. Other signals can be quantified according to characteristics, such as voltage, current, electric field strength, magnetic field strength, frequency, power, temperature, or the like. Absence of signal may refer to a signal level of zero or a signal level that is not meaningfully distinguished from noise.

The term "virtual fiducial" may refer to a point of reference that is applied to an object within an image and that is derived from a source other than the object or image, respectively. For example, a virtual fiducial may be derived from a first object (e.g., a template object or standard object) and applied to an image for a second object. Alternatively, a virtual fiducial can be derived from a design, drawing, or plan used to create the object. In one or more cases, a virtual fiducial may be represented or specified as described herein for a fiducial. In one or more cases, a virtual fiducial may be provided in a computer readable format or medium such as those described herein.

The term "X-Y coordinates" may refer to information that specifies location, size, shape, and/or orientation in an X-Y plane. The information may be, for example, numerical coordinates in a Cartesian system. The coordinates may be provided relative to one or both of the X and Y axes or can be provided relative to another location in the X-Y plane. For example, coordinates of a feature of an object (e.g., a cluster corresponding to a well of a flow cell) can specify the location of the feature relative to location of a fiducial or other feature of the object. The term "X-Y plane" may refer to a 2D area defined by straight line axes X and Y. When used in reference to a detector (e.g., detector subsystem 215 of FIG. 2B) and an object observed by the detector, the area can be further specified as being orthogonal to the direction of observation between the detector and object being detected. The term "Z coordinate" may refer to information that specifies the location of a point, line, or area along an axes that is orthogonal to an X-Y plane. In one or more cases, the Z axis is orthogonal to an area of an object that is observed by a detector. For example, the direction of focus for an optical system may be specified along the Z axis.

An increasing number of applications have been developed for arrays with features having biological molecules, such as nucleic acids and polypeptides. Such arrays typically include deoxyribonucleic acid (DNA) or ribonucleic acid (RNA) probes, though the techniques may also be applicable to other protein or chemical analysis. For example, DNA and/or RNA probes may be used to identify nucleotide sequences present in humans and other organisms. In one or more applications, for example, individual DNA or RNA probes can be attached at individual features of an array. A test sample, such as from a known person or organism, can be exposed to the array, such that target nucleic acids (e.g., gene fragments, mRNA, amplicons thereof, etc.) hybridize to complementary probes at respective features in the array. The probes can be labeled in a target specific process (e.g., due to labels present on the target nucleic acids or due to enzymatic labeling of the probes or targets that are present in hybridized form at the features). The array can then be examined by scanning specific frequencies of light over the features to identify which target nucleic acids are present in the sample.

Biological arrays may be used for genetic sequencing and similar applications. Genetic sequencing may include determining the order of nucleotides in a length of target nucleic acid, such as a fragment of DNA or RNA. Relatively short sequences may be sequenced at each feature, and the resulting sequence information may be used in various bioinformatics methods to logically fit the sequence fragments together so as to reliably determine the sequence of much more extensive lengths of genetic material from which the fragments were derived. Automated, computer-based systems for characteristic fragments may be used in genome mapping, identification of genes and their function, and so forth. Arrays may be utilized to characterize genomic content as a large number of variants are present within the arrays, which supplants the alternative of performing many experiments on individual probes and targets.

Any of a variety of analyte arrays can be used in the processes described herein. An array may contain features, in which each feature has an individual probe or a population of probes. In the latter case, the population of probes at each feature may be homogenous and may correspond to a single species of probe. For example, in the case of a nucleic acid array, each feature can have multiple nucleic acid molecules each having a common sequence. In other cases, the populations at each feature of an array may be heterogeneous.

Similarly, protein arrays can have features with a single protein or a population of proteins having the same amino acid sequence. The probes may be attached to the surface of an array, for example, via covalent linkage of the probes to the surface or via non-covalent interaction(s) of the probes with the surface. In some examples, probes, such as nucleic acid molecules, can be attached to a surface via a gel layer as described, for example, in U.S. Pat. No. 9,012,022, issued Apr. 21, 2015, and/or U.S. Patent Publication No. 2011/0059865, filed Jan. 7, 2005, each of which is incorporated herein by reference. In other examples, arrays may include those that are used in nucleic acid sequencing applications. In some other examples, arrays used for nucleic acid sequencing often have random spatial patterns of nucleic acid features. For example, HiSeq or MiSeq sequencing platforms available from Illumina Inc. (San Diego, Calif) utilize flow cells upon which nucleic acid arrays are formed by random seeding followed by bridge amplification. Further, patterned arrays can also be used for nucleic acid sequencing or other analytical applications. The features of such patterned arrays may be used to capture a single nucleic acid template molecule to seed subsequent formation of a homogenous colony, for example, via bridge amplification.

In one or more cases, the size of a feature on an array (or other object used in the processes described herein) may be selected to suit a particular application. For example, in some cases a feature of an array may have a size that accommodates a single nucleic acid molecule. A surface having a plurality of features in this size range may be used for constructing an array of molecules for detection at single molecule resolution. Features in this size range may be used in arrays having features that each contain a colony of nucleic acid molecules. In one or more examples, a feature, such as a well in a flow cell, may have a diameter ranging from about 200 nm to about 1 μm, and a pitch of about 400 nm. In one or more examples, a height of a tile may be about 600 μm. In one or more examples, a width of a tile may be about 1000 μm. In one or more examples, the features of an array may each have an area that is no larger than about 1 $mm^2$, no larger than about 500 $μm^2$, no larger than about 100 $μm^2$, no larger than about 10 $μm^2$ no larger than about 1 $μm^2$, no larger than about 500 $nm^2$, no larger than about 100 $nm^2$, no larger than about 10 $nm^2$, no larger than about 5 $nm^2$, or no larger than about 1 $nm^2$. Alternatively or additionally, the features of an array may be no smaller than about 1 $mm^2$, no smaller than about 500 $μm^2$, no smaller than about 100 $μm^2$, no smaller than about 10 $μm^2$, no smaller than about 1 $μm^2$, no smaller than about 500 $nm^2$, no smaller than about 100 $nm^2$, no smaller than about 10 $nm^2$, no smaller than about 5 $nm^2$, or no smaller than about 1 $nm^2$. A feature may have a size that is in a range between an upper and lower limit selected from those exemplified above. Although several size ranges for features of a surface have been exemplified with respect to nucleic acids and on the scale of nucleic acids, it will be understood that features in these size ranges may be used for applications that do not include nucleic acids. It will be further understood that the size of the features need not necessarily be confined to a scale used for nucleic acid applications.

For the cases that include an object having a plurality of features, such as an array of features, the features may be discrete, and separated with spaces between each other. As such, the array may have features that are separated by edge-to-edge distance of at most 100 μm, 50 μm, 10 μm, 5

μm, 1 μm, or 0.5 μm. Alternatively or additionally, the array may have features that are separated by an edge-to-edge distance of at least 0.5 μm, 1 μm, 5 μm, 10 μm, 50 μm, or 100 μm. These ranges may apply to the average edge to edge spacing for features as well as to the minimum or maximum spacing.

In one or more cases, the features of an array may not be discrete and instead neighboring features can abut each other. Whether or not the features are discrete, the size of the features and/or pitch of the features may vary such that arrays can have a desired density. For example, the average feature pitch in a regular pattern can be at most 100 μm, 50 μm, 10 μm, 5 μm, 1 μm, or 0.5 μm. Alternatively or additionally, the average feature pitch in a regular pattern can be at least 0.5 μm, 1 μm, 5 μm, 10 μm, 50 μm, or 100 μm. In some cases, these ranges can apply to the maximum or minimum pitch for a regular pattern. For example, the maximum feature pitch for a regular pattern can be at most 100 μm, 50 μm, 10 μm, 5 μm, 1 μm, or 0.5 am; and/or the minimum feature pitch in a regular pattern can be at least 0.5 μm, 1 μm, 5 μm, 10 μm, 50 μm, or 100 μm.

The density of features in an array can also be understood in terms of the number of features present per unit area. For example, the average density of features for an array can be at least $1\times10^3$ features/mm$^2$, $1\times10^4$ features/mm$^2$, $1\times10^5$ features/mm$^2$, $1\times10^6$ features/mm$^2$, $1\times10^7$ features/mm$^2$, $1\times10^8$ features/mm$^2$, or $1\times10^9$ features/mm$^2$ or higher. Alternatively or additionally, the average density of features for an array can be at most $1\times10^9$ features/mm$^2$, $1\times10^8$ features/mm$^2$, $1\times10^7$ features/mm$^2$, $1\times10^6$ features/mm$^2$, $1\times10^5$ features/mm$^2$, $1\times10^4$ features/mm$^2$, or $1\times10^3$ features/mm$^2$ or less.

The above ranges can apply to all or part of a regular pattern including, for example, all or part of an array of features.

The features in a pattern may have any of a variety of shapes. For example, when observed in a 2D plane, such as on the surface of an array, the features may appear rounded, circular, oval, rectangular, square, symmetric, asymmetric, triangular, polygonal, and/or the like. The features may be arranged in a regular repeating pattern including, for example, a hexagonal or rectilinear pattern. A pattern can be selected to achieve a desired level of packing. For example, round features may be packed in a hexagonal arrangement. In another example, round features may be packed in a rectilinear pattern.

A pattern may be characterized in terms of the number of features that are present in a subset that forms the smallest geometric unit of the pattern. The subset can include, for example, at least 2, 3, 4, 5, 6, 10 or more features. Depending upon the size and density of the features, the geometric unit may occupy an area less than 1 mm$^2$, 500 μm$^2$, 100 μm$^2$, 50 μm$^2$, 10 μm$^2$, 1 μm$^2$, 500 nm$^2$, 100 nm$^2$, 50 nm$^2$, 10 nm$^2$, or less. Alternatively or additionally, the geometric unit may occupy an area greater than 10 nm$^2$, 50 nm$^2$, 100 nm$^2$, 500 nm$^2$, 1 μm$^2$, 10 μm$^2$, 50 μm$^2$, 100 m$^2$, 500 μm$^2$, 1 mm$^2$, or more. Characteristics of the features in a geometric unit, such as shape, size, pitch and the like, may be selected from with regard to features in an array or pattern.

An array having a regular pattern of features may be ordered with respect to the relative locations of the features, but random with respect to one or more other characteristics of each feature. For example, in the case of a nucleic acid array, the nucleic acid features may be ordered with respect to their relative locations but random with respect to one's knowledge of the sequence for the nucleic acid species present at any particular feature. As a more specific example, nucleic acid arrays formed by seeding a repeating pattern of features with template nucleic acids and amplifying the template at each feature to form copies of the template at the feature (e.g., via cluster amplification or bridge amplification) may have a regular pattern of nucleic acid features but may be random with regard to the distribution of sequences of the nucleic acids across the array. Thus, detection of the presence of nucleic acid material on the array may yield a repeating pattern of features, whereas sequence specific detection may yield non-repeating distribution of signals across the array.

It is noted that the description herein of patterns, order, randomness and the like pertain not only to features on objects, such as features on arrays, but also to features in images. As such, patterns, order, randomness and the like can be present in any of a variety of formats that are used to store, manipulate or communicate image data including, but not limited to, a computer readable medium or computer component such as a graphical user interface or other output device.

In one or more cases, fiducials are included on an object (or in an image) to facilitate identification and localization of individual features on the object. Fiducials may be utilized to register a spatially ordered pattern of features, as the fiducials provide a point of reference for relative locations of other features. Fiducials may be utilized for applications in which an array is detected repeatedly to follow changes occurring at individual features over time. For example, fiducials may allow individual nucleic acid clusters to be followed through sequential images obtained over multiple sequencing cycles, such that the sequence of nucleic acid species present at individual clusters may be discretely determined. Fiducials may be included on or in the arrays, such as on one or more surfaces of patterned array supports or substrates (i.e., whether in an array or in any random or other layout), as well as in image data of the wells and molecules to facilitate identification and localization of individual features on the array, including the wells at which the molecules are located.

Figure 1B:
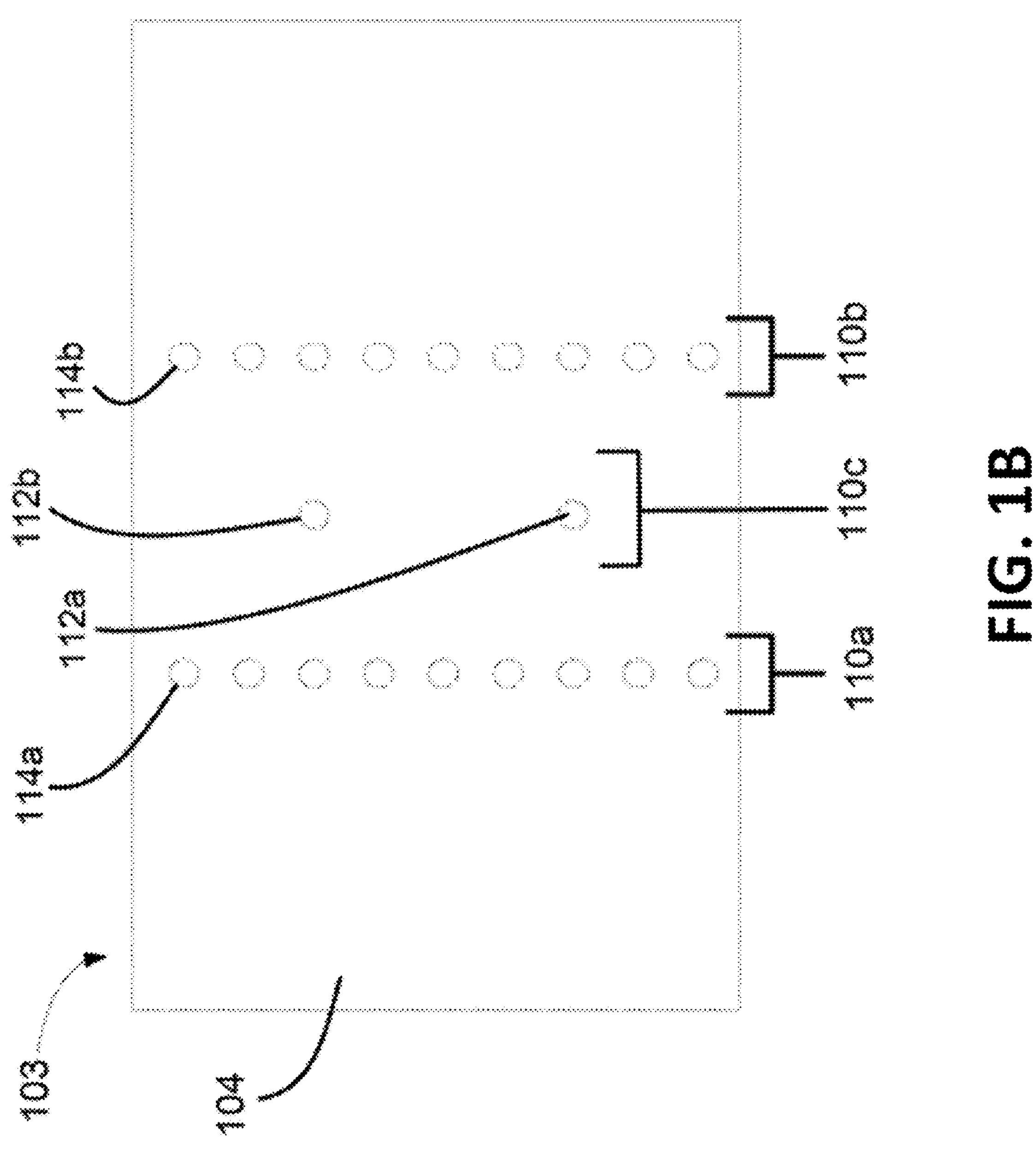
Figure 1C:
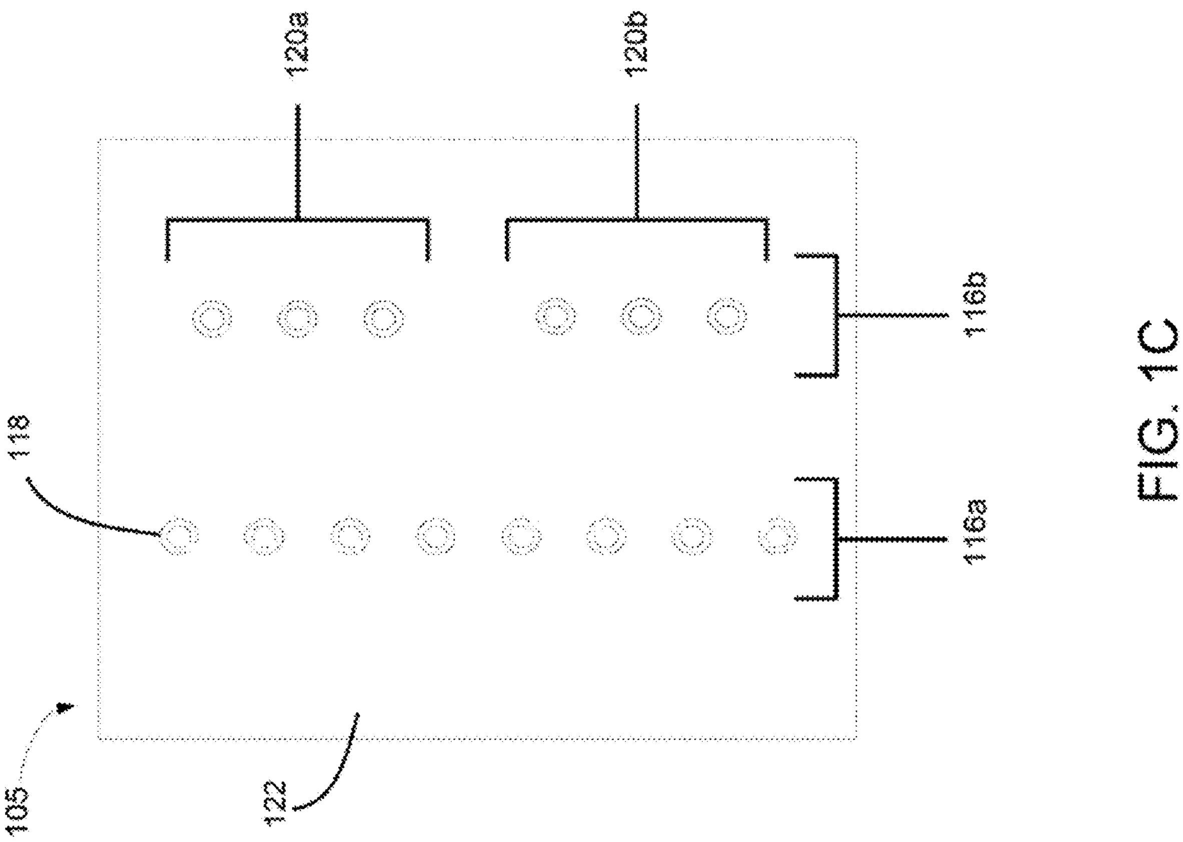

Fiducials may be arranged in a variety of patterns, as illustrated in the example images 101, 103, and 105 of FIGS. 1A-1C. In some cases, as illustrated in FIGS. 1A and 1B, fiducials may be linearly arranged in a parallel or substantially parallel direction with one another. For example, as illustrated in an example tile 102 of FIG. 1A, a set of fiducials **108*a* may extend across the tile 102 in a parallel direction with another set of fiducials 108*b*. It is noted that a set of fiducials may include any number of fiducials (e.g., but not limited to, two fiducials, three fiducials, four fiducials, eight fiducials, and nine fiducials). Further, for simplicity, example images 101, 103, and 105 are illustrated in view of one tile (e.g., tiles 102, 104, and 122**), respectively. However, it should be understood that an image may be divided into a plurality of imaging data subsets (e.g., tiles) corresponding to a respective region of a patterned sample.

In some cases, a set of fiducials and an adjacent set of fiducials may include the same number of fiducials. For example, the set of fiducials **108*a* may include four fiducials, and the set of fiducials 108*b* may include four fiducials, as illustrated in FIG. 1A. In other cases, one set of fiducials may have a greater number of fiducials than an adjacent set of fiducials. For example, the set of fiducials 116*a* may have eight fiducials, and the adjacent set of fiducials may have six fiducials. In one or more cases, a set of fiducials may be centrally disposed in between two adjacent sets of fiducials. For example, as illustrated in the example tile 104 of FIG. 1B, the set of fiducials 110*c* may include two fiducials disposed in between the sets of fiducials 110***a*, 110*b*. In one or more cases, a set of fiducials may be staggered in view of another set of fiducials. For example, as illustrated in the example tile 122 of FIG. 1C, the fiducials 118 within the set of fiducials 116*a* may be evenly spaced apart from one another, whereas the fiducials of the set of fiducials 116*b* may be separated into groups (e.g., groups 120*a* and 120*b*). In some cases, the groups may be spaced apart from one another, such that the space between groups is greater than the space between the fiducials within the respective groups. In one or more cases, a fiducial of one set of fiducials may be aligned with a fiducial of another set of fiducials. For example, as illustrated in FIG. 1A, fiducial 106*a* of the set 108*a* may be horizontally aligned with fiducial 106*b* of the set 108*b*, and fiducial 107*a* of the set 108*a* may be horizontally aligned with fiducial 107*b* of the set 108*b*. It is noted that although arrangements 101, 103, and 105 of FIGS. 1A-1C illustrate two and three sets of columns of fiducials, it should be understood that an arrangement may include any number of sets of fiducials.

With respect to the arrangement of fiducials within image 103 (i.e., the 9×2×9 flow cell fiducial layout), the arrangement is configured to ensure data quality against increases in jitter. The arrangement includes two fiducials 112*a* and 112*b*, which are included in the center of the arrangement with sufficient distance from all other fiducials, such as those in the sets of fiducials 110*a*, 110*b*, to avoid finding the wrong fiducial due to drift. That is, as jitter induces perturbations within the image and data quality becomes distorted, the fiducials 112*a* and 112*b* may be used as reference fiducials to correct for drift and locate fiducials within the sets of fiducials 110*a*, 110*b*. Further, to reduce computational costs of locating additional fiducials and significantly increasing the speed of the image registration process, the size of the fiducials within the arrangement illustrated in FIG. 1B are reduced compared to the size of the fiducials utilized in FIG. 1A. For example, the fiducials of tile 102 may each have a diameter of 50 μm. In another example, the fiducials of tile 104 may each have a diameter of 25 μm.

Fiducials may be comprised in a variety of shapes. For example, a fiducial may be a set of concentric circles (e.g., fiducials 106*a*, 106*b* in FIG. 1A). That is, the fiducial may form, for example, a bulls-eye fiducial, examples, of which are set forth in U.S. Pat. No. 9,512,422, issued Dec. 6, 2016, U.S. Pat. No. 11,262,307, issued Mar. 1, 2022, and U.S. Pat. No. 11,308,640, issued Apr. 19, 2022, each of which is incorporated herein by reference. In another example, a fiducial may be a circle (e.g., fiducials 114*a*, 114*b* in FIG. 1). In one or more cases, an array of wells or other features may include a fiducial that forms a pattern of multiple rings. In one or more cases, registration of an image may be carried out by lining up (e.g., overlaying) a fiducial in the image (e.g., a virtual fiducial image) with a fiducial in a sub-image, as further described herein. The correlation of fit can be determined by computing a similarity measure, such as the two-dimensional cross-correlation, sum of squared intensity differences or the like. Optimal correlation of fit may be identified as the positioning where the brightest pixels from the image overlap with the brightest pixels on the reference image. Alternatively or additionally, optimal correlation may be identified as a measure of how strong the best correlation between the virtual fiducial image and the sub-image is relative to the second-best correlation between the virtual fiducial image and the sub-image, as further described herein. It is noted that circular symmetry is optional for fiducials. Other symmetries can be utilized instead. Furthermore, symmetry in general is optional and asymmetric fiducials can be used instead. Moreover, in one or more cases, a fiducial may have a footprint that is larger than the area of each individual feature of an object that is to be registered. In some cases, the fiducial may have a footprint that is larger than the geometric unit of features that is repeated in a repeating pattern. A larger footprint for the fiducial may reduce the risk of 'walk-offs' or integral offsets (e.g., such as vertical or horizontal translation), in which the registration may appear correct locally within a geometric unit of features in a repeating pattern, but each feature (or geometric unit of features) is mistaken for its neighbor.

In an example, fiducials that are known at well-defined locations can be located in image data using a templating matching technique. For instance, a theoretical grid or model of fiducial locations can be generated based on the known positions of the fiducial in the flow cell. Then, an image may be captured that includes data corresponding to one or more fiducials within the image region. Although the image including the fiducials may be perturbed and/or distorted such that the relative locations between captured fiducials includes some amount of error, the template may be used to determine approximate locations of fiducials within the image despite the presence of such errors. Once the relative locations of the fiducials within the image have been determined using the template, image processing techniques (as described in more detail below) may be used to determine the locations of other features within the image based on their known positions relative to the fiducials. For example, one or more geometric transforms (e.g., an affine transform) may be performed on the image using the located fiducials in order to account for errors in relative position of objects within the image due to a variety of environmental and/or optical perturbations. In order to account for error introduced by high frequency jitter due, for example, to non-uniform movements in the stage, a given region may be divided into a plurality of sub-regions and the geometric transform can be applied individually per sub-region. Such techniques are described in more detail below.

Figure 2A:
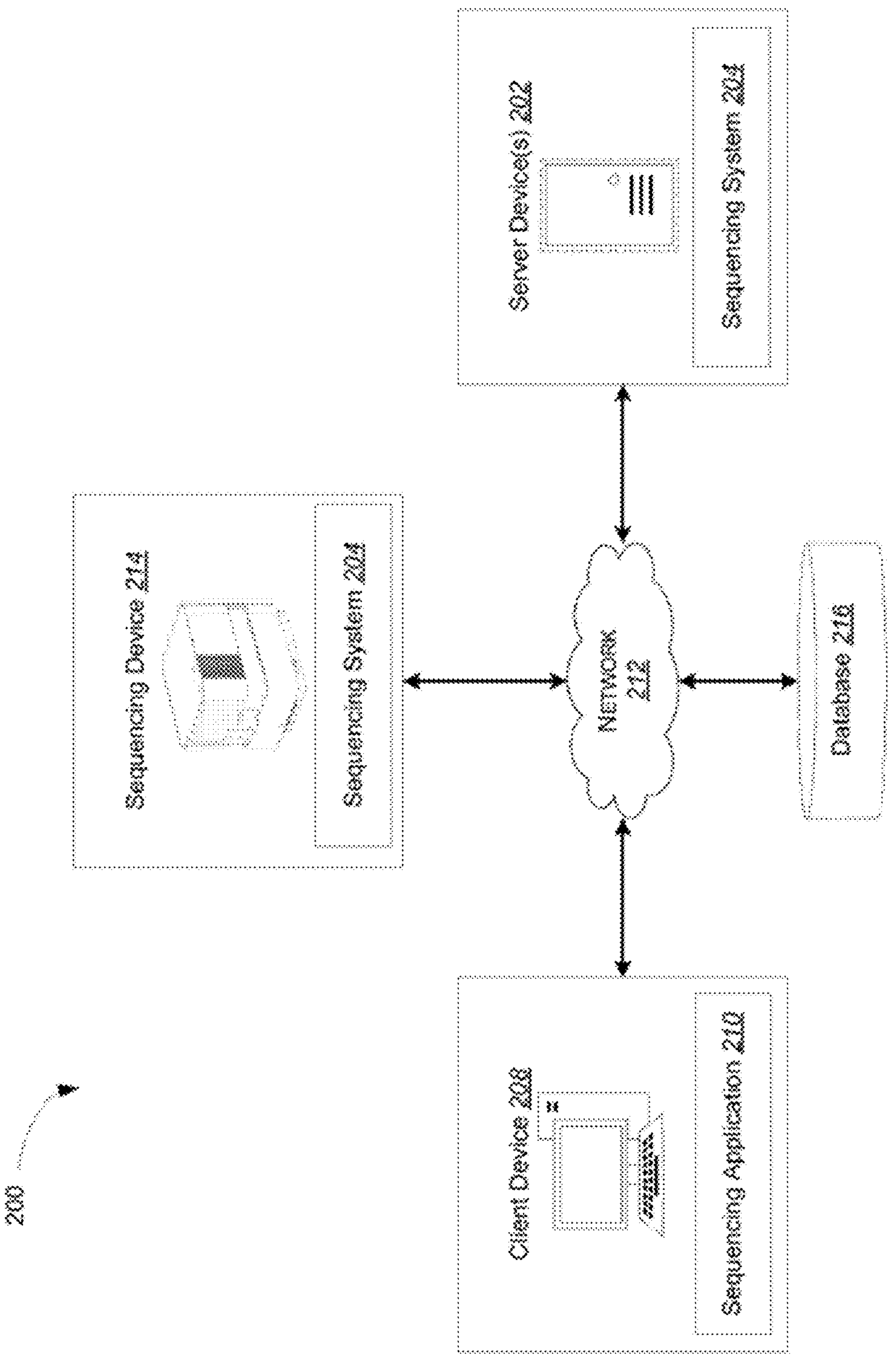
FIG. 2A illustrates a schematic diagram of an example system environment.

FIG. 2A illustrates a schematic diagram of a system environment (or "environment") 200, as described herein. As illustrated, the environment 200 includes one or more server device(s) 202 connected to one or more of a client device 208, a database 216, and a sequencing device 214 via a network 212.

As shown in FIG. 2A, the server device(s) 202, the client device 208, the database 216, and the sequencing device 214 may communicate with each other via the network 212. The network 212 may comprise any suitable network over which computing devices can communicate. The network 212 may include a wired and/or wireless communication network. Example wireless communication networks may be comprised of one or more types of radio frequency (RF) communication signals using one or more wireless communication protocols, such as a cellular communication protocol, a wireless local area network (WLAN) or WIFI communication protocol, and/or another wireless communication protocol. Though FIG. 2A illustrates the components of environment 200 communicating via the network 212, it will be appreciated that the components of environment 200 may communicate directly with each other, for example, bypassing the network 212. For example, the client device 208 may communicate directly with the sequencing device 214.

As indicated by FIG. 2A, the sequencing device 214 may comprise a device for sequencing a biological sample. In one or more cases, the biological sample may include, for example, but not limited to, human and non-human DNA to determine individual nucleotide bases of nucleic-acid sequences (e.g., sequencing by synthesis). In one or more cases, the biological sample may include, for example, but not limited to, human and non-human RNA. The sequencing device 214 may analyze nucleic-acid segments and/or oligonucleotides extracted from samples to generate nucleotide reads and/or other data utilizing computer implemented methods and systems described herein either directly or indirectly on the sequencing device 214. More particularly, the sequencing device 214 may receive and analyze, within nucleotide-sample slides (e.g., flow cells), nucleic-acid sequences extracted from samples. The sequencing device 214 may utilize sequencing-by-synthesis (SBS) to sequence nucleic-acid segments into nucleotide reads.

In one or more cases, the sequencing device 214 may correct high frequency motions (i.e., jitter) of a stage that leads to inconsistent movement of locations of spots within an image. That is, the sequencing device 214 may perform the processes described herein that reduce the introduction and/or amount of jitter on a per sub-region basis. A spot may correspond to clusters of DNA molecules and/or a fiducial within a well of a flow cell. The sequencing device 214 may obtain an image of an object (e.g., the flow cell) that has a plurality of fiducials arranged in a pattern. One example fiducial pattern may include a set of four fiducials linearly arranged adjacent to another set of four fiducials. Another example fiducial pattern may include a set of nine fiducials linearly arranged adjacent to another set of nine fiducials, in which a set of two fiducials are centrally disposed between the first and second set of nine fiducials. The sequencing device 214 may generate locations of the fiducials and decompose the image into sub-regions, such that each sub-region includes a subset of fiducials. The sequencing device 214 may perform a process (e.g., a template matching process) on the fiducials within the image in order to first locate the fiducials. For instance, the relative location of the fiducials may be known prior to obtaining the image. The known locations of the fiducials may be used to generate a pattern or reference data that is compared to the image that includes captured or recorded versions of the fiducials. The captured fiducials within the image may not be located relative to each other in the exact positions expected based on the known pattern, for example due to limitations in the optics of the image capturing device and/or other errors associated with obtaining the image. However, using the known reference pattern and the template matching process, the fiducials within the image can be located after a first reference fiducial is located and the image is compared to the known pattern.

Once the fiducials within the image have been located using the reference data, the image can be divided into multiple sub-regions, each of which include multiple (e.g., at least three) fiducials at given positions within the respective sub-region. Further, the sequencing device 214 may perform a geometric transformation (i.e., an affine transform) on each sub-region to generate a representation of how the image data may have been perturbed or distorted compared to the actual location of objects that were captured in the image (e.g., due to non-linearities or other errors introduced in the image capture process). In this manner, since the arrangement of the fiducials within each sub-region and/or the location of one or more features within each sub-region are known relative to the positions of the fiducials, the determined transform for the sub-region can be used to locate the position of the features within the image. Such techniques allow for the positions of the features to be determined even due to errors introduced in the image capture process. Further, by performing the geometric transform on a per sub-region basis, errors introduced due to the high-frequency jitter caused due to non-uniform movements in the stage can be corrected.

By performing the geometric transform on a per sub-region basis, individual representations of the relative perturbations/errors in the image data can be determined for sub-regions that are small enough in area that the high-frequency jitter has little effect and the errors associated with such jitter are reduced. That is, an area of a sub-region may be selected such that the sub-region is substantially invariant to the high-frequency jitter and the errors associated with such jitter that may impact the whole of the sequencing image. For example, the geometric transform may correspond to an affine transform and the result affine matrices may be generated for each sub-region. Based on the generated arrangement of fiducials within the sub-region and the determined transform for the sub-region, the sequencing device 214 may determine the locations of the spots of the flow cell within the sub-region. That is, the sequencing device 214 may use each determined matric(es) to account for jitter and correct the positioning of the location of spots within the image. Thus, while most or all of a sequencing image may be impacted by jitter, the sequencing device 214 may construct local regions within the image to be small enough to be locally invariant to the same jitter that impacts the whole of the sequencing image. For example, each sub-region may be on the order of 200 Hz or less in order to correct for jitter that is expected to have a frequency of 400 Hz and to impact the whole of the sequencing image.

As further illustrated by FIG. 2A, the server device(s) 202 may generate, receive, analyze, store, and/or transmit digital data, such as, but not limited to image data, data for determining nucleotide-base calls or sequencing nucleic-acid polymers, and the like. As shown in FIG. 2A, the sequencing device 214 may generate and send (and the server device(s) 202 may receive) image data, nucleotide reads and/or other data analyzed by the server device(s) 202.

In one or more cases, the server device(s) 202 may communicate with the client device 208. For example, the server device(s) 202 may send data to the client device 208, including image data, sequencing data, or other information, and the server device(s) 202 may receive input from the user via client device 208.

In some cases, the server device(s) 202 may include a distributed collection of servers, in which the server device(s) 202 include a number of server devices distributed across the network 212. In some examples, the distributed server device(s) 202 may be located in the same location or at different physical locations. In other cases, the server device(s) 202 may comprise a content server, an application server, a communication server, a web-hosting server, or another type of server.

In one or more cases, the server device(s) 202 and/or the sequencing device 214 may include a sequencing system 204 or portions thereof. The sequencing system 204 may analyze nucleotide reads, image data, and/or other data, such as sequencing metrics generated by the sequencing device 214, for example, to correct image data distortion. In another example, the sequencing system 204 may analyze nucleotide reads, image data, and/or other data, such as sequencing metrics generated by the sequencing device 214, for example, to determine nucleotide base sequences for nucleic-acid polymers. For example, the sequencing system 204 may receive raw data generated by the sequencing device 214. The sequencing system 204 may determine a nucleotide base sequence for a nucleic-acid segment, based on the received raw data. In one or more cases, the raw data may be received by the sequencing device 214 in a file format, such as, but not limited to, a FASTQ file, that is capable of being recognized for processing. A FASTQ file may include a text file that contains the sequence data from clusters that pass filter on a flow cell. The FASTQ format is a text-based format for storing both a biological sequence (e.g., such as a nucleotide sequence) and corresponding quality scores of the biological sequence. In one or more cases, the sequencing system 204 may process the sequencing data to determine the sequences of nucleotide bases in DNA and/or RNA segments or oligonucleotides. The sequencing system 204, or one or more portions thereof, residing on the sequencing device 214 may allow for on-device analysis of sequencing data, image data, and the like. The sequencing system 204, or one or more portions thereof, residing on the sequencing device 214 may allow the sequencing device 214 to monitor a status of one or more applications operating to perform analysis on sequencing data.

The client device 208 may generate, store, receive, and/or send digital data for enabling the sequencing processes and analysis described herein. For example, the client device 208 may receive sequencing metrics from the sequencing device 214. The client device 208 may communicate with the server device(s) 202 and/or sequencing device 214 to receive one or more files comprising nucleotide base calls and/or other metrics. In one or more cases, the client device 208 may present or display information pertaining to the nucleotide-base call within a graphical user interface of the client device 208 to a user. The client device 208 may comprise various types of client devices. In some examples, the client device 208 may be a non-mobile device, such as desktop computer, server, or the like. In other examples, the client device 208 may be a mobile device, such as a laptop, tablet, mobile telephone, smartphone, or the like. The client device 208 may include a sequencing application 210. The sequencing application 210 may be, for example, a web application or a native application (e.g., a mobile application, desktop application) stored and executed on the client device 208. In one or more cases, the sequencing application 210 may include instructions that (when executed) cause the client device 208 to receive data from the sequencing device 214 and present within a graphical user interface of the client device 208, data, such as, but not limited to data from a variant call file.

The environment 200 may include the database 216. The database 216 may store information such as, but not limited to, variant call files, sample nucleotide sequences, nucleotide reads, nucleotide-base calls, sequencing metrics, population data, imaging data, and/or other data as described herein. The server device(s) 202, the client device 208, and/or the sequencing device 214 may communicate with the database 216 (e.g., via the network 212) to store and/or access information, such as, but not limited to, variant call files, sample nucleotide sequences, nucleotide reads, nucleotide-base calls, sequencing metrics, population data, imaging data, and/or other data as described herein.

The environment 200 may be included in a local network or local high-performance computing (HPC) system. In one or more other cases, the environment 200 may be included in a cloud computing environment comprising a plurality of server devices, such as server device(s) 202, having software and/or data distributed thereon. In one or more cases, the sequencing system 204 may be implemented to operate one or more subsystems as described herein. The sequencing system 204 may be distributed across server devices 202 having access to the database 216 via the network 212 in a cloud-based computing system.

Figure 2B:
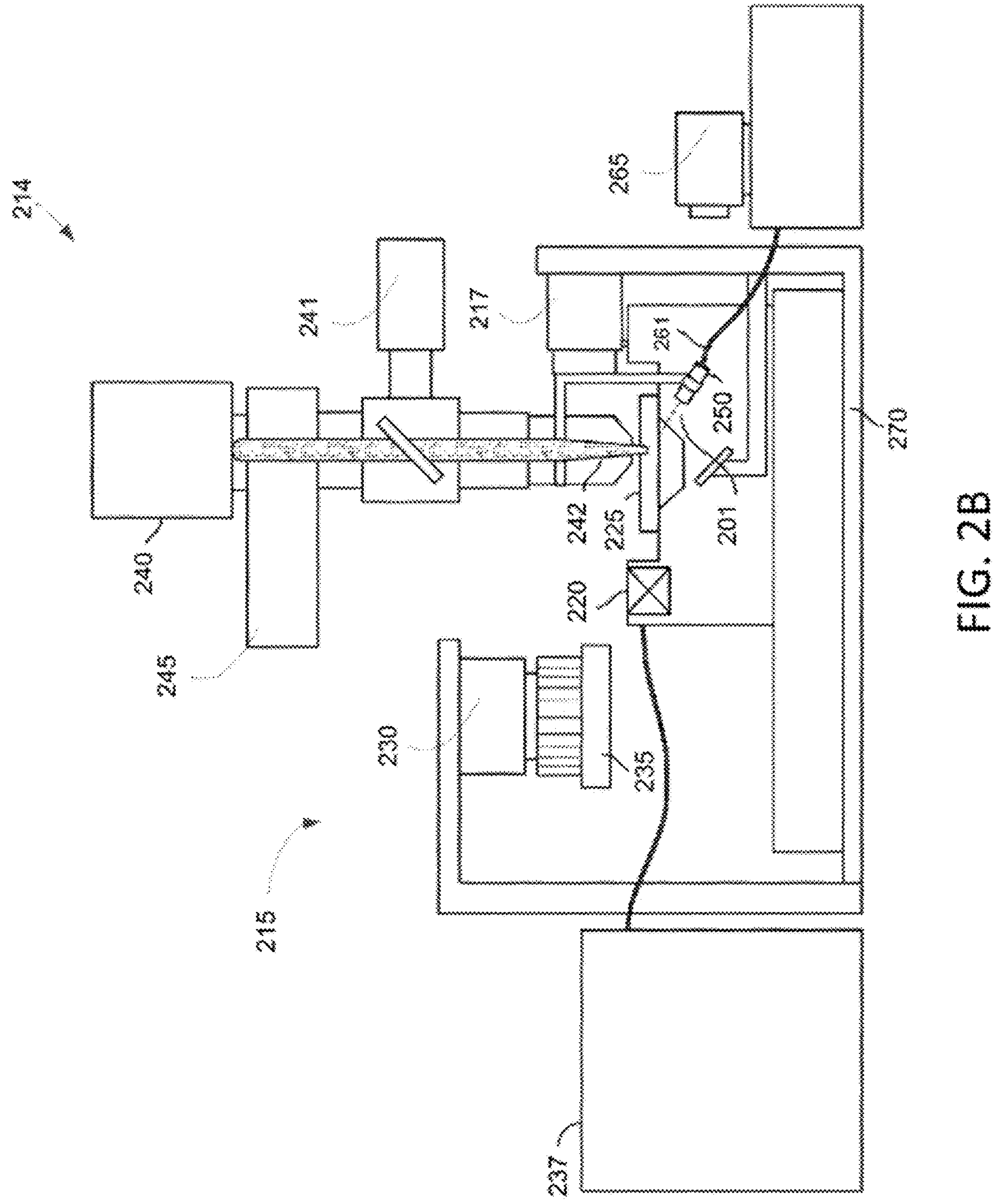
FIG. 2B illustrates an example image scanning system.

FIG. 2B illustrates an example of one or more sequencing subsystems that may be implemented by the sequencing device 214 and may be monitored and/or controlled by a computing subsystem when performing analysis on one or more flow cells. In addition to or alternatively, the subsystems may be controlled in response to the schedule/workflow that is determined by the computing subsystem. In one or more cases, the detector subsystem 215 may be configured to perform analysis on one or more samples.

The example sequencing device 214 may include a device for obtaining or producing an image of a sample. The system 215 (i.e., the detector subsystem) of FIG. 2B illustrates an example imaging configuration of a backlight design implementation. It should be noted that although systems and methods may be described herein from time to time in the context of example system 215, these are only examples with which implementations of the image distortion correction methods disclosed herein may be implemented.

As illustrated in FIG. 2B, subject samples are located on a flow cell 225, which is positioned on a stage 270 under an objective lens 242. It is noted that FIG. 2B illustrates one flow cell 225, but it should be understood that the system 215 may perform analysis on more than one flow cell 225. Light source 250 and associated optics direct a beam of light, such as laser light, to a chosen sample location on the flow cell 225. The sample fluoresces and the resultant light is collected by the objective lens 242 and directed to an image sensor of camera system 240 to detect the florescence. Stage 270 is moved relative to objective lens 242 to position the next sample location on the flow cell 225 at the focal point of the objective lens 242. Movement of stage 270 relative to objective lens 242 can be achieved by moving the stage itself, the objective lens, some other component of the imaging system, or any combination of the foregoing. Further implementations may also include moving the entire imaging system over a stationary flow cell.

The sequencing device 214 directs the flow of reagents (e.g., fluorescently labeled nucleotides, buffers, enzymes, cleavage reagents, etc.) to (and through) the flow cell 225 and waste valve 220. The flow cell 225 may be a sample container that includes one or more substrates upon which the samples are provided. For example, in the case of a system to analyze a large number of different nucleic acid sequences, the flow cell 225 includes one or more substrates on which nucleic acids to be sequenced are bound, attached or associated. In one or more cases, the substrate may include any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. In one or more cases, the substrate is within a channel or other area at a plurality of locations formed in a matrix or array across the flow cell 225.

In one or more cases, the flow cell 225 may include a biological sample that is imaged using one or more fluorescent dyes. For example, the flow cell 225 may be implemented as a patterned flow cell including a translucent cover plate, a substrate, and a liquid sandwiched therebetween, and a biological sample may be located at an inside surface of the translucent cover plate or an inside surface of the substrate. The flow cell 225 may include a large number (e.g., thousands, millions, or billions) of wells or regions that are patterned into a defined array (e.g., a hexagonal array, rectangular array, etc.) into the substrate. Each region may form a cluster (e.g., a monoclonal cluster) of a biological sample such as DNA, RNA, or another genomic material which may be sequenced, for example, using sequencing by synthesis. The flow cell 225 may be further divided into a number of spaced apart lanes (e.g., eight lanes), each lane including a hexagonal array of clusters. Example flow cells that may be used in implementations disclosed herein are described in U.S. Pat. No. 8,778,848, which is incorporated by reference in its entirety.

The system 215 may include temperature station actuator 230 and heater/cooler 235 that optionally regulates the temperature of conditions of the fluids within the flow cell 225. Camera system 240 can be included to monitor and track the sequencing of the flow cell 225. Camera system 240 can be implemented, for example, as a charge-coupled device (CCD) camera (e.g., a time delay integration (TDI) CCD camera), which can interact with various filters within filter switching assembly 245, objective lens 242, and focusing light source 250. Camera system 240 is not limited to a CCD camera and other cameras and image sensor technologies can be used. In some examples, sensor(s) of the camera system 240 may have a pixel size between about 5 and about 15 μm.

Output data from the sensors of camera system 240 may be communicated to a real time analysis module (e.g., real time analysis module 291 of FIG. 2C) that may be implemented as a software application that analyzes the image data (e.g., image quality scoring), reports or displays the characteristics of the laser beam (e.g., focus, shape, intensity, power, brightness, position) to a graphical user interface (GUI), and, as further described below, dynamically corrects distortion in the image data.

Light source 250 (e.g., an excitation laser within an assembly optionally comprising multiple lasers) or other light source can be included to illuminate fluorescent sequencing reactions within the samples via illumination through a fiber optic interface (which can optionally comprise one or more re-imaging lenses, a fiber optic mounting, etc.). The system 215 may include a low watt lamp 265, focusing laser 261, and reverse dichroic. In some cases, focusing laser 261 may be turned off during imaging. In other cases, an alternative focus configuration may include a second focusing camera (not shown), which may be a quadrant detector, a Position Sensitive Detector (PSD), or similar detector to measure the location of the scattered beam reflected from the surface concurrent with data collection. Although illustrated as a backlit device, other examples may include a light from a laser or other light source that is directed through the objective lens 242 onto the samples on the flow cell 225.

The flow cell 225 may be placed within a flow cell holder (e.g., sample container holder), which may be placed upon movable staging area 270. The flow cell holder may hold, for example, a flow cell securely in the proper position or orientation in relation to the light source 250, the prism (not shown), which directs laser illumination onto the imaging surface, and the camera system 240, while the sequencing occurs. As such, the flow cell 225 may be mounted on the stage 270 to provide movement and alignment of the flow cell 225 relative to the objective lens 242. The stage 270 may have one or more actuators to allow the stage 270 to move in any of three dimensions. For example, in terms of the Cartesian coordinate system, actuators may be provided to allow the stage 270 to move in the X, Y and Z directions relative to the objective lens. This may allow one or more sample locations on the flow cell 225 to be positioned in optical alignment with objective lens 242. For example, depending upon the device design and the imaging technique used, the patterned array, encased in the flow cell 225, may be initially located in the X-Y plane, and moved in this plane during imaging, or imaging components may be moved parallel to this plane during imaging. The flow cell 225 may extend in the X-Y plane, with the X direction being the longer direction of the flow cell 225, and the Y direction being the shorter direction (the flow cells being rectangular). It is to be understood, however, that this orientation could be reversed.

A focus (z-axis) component 217 may control positioning of the optical components relative to the flow cell 225 in the focus direction (typically referred to as the z axis, or z direction). Focus component 217 may include one or more actuators physically coupled to the optical stage or the sample stage, or both, to move the flow cell 225 on stage 270 relative to the optical components (e.g., the objective lens 242) to provide proper focusing for the imaging operation. For example, the actuator may be physically coupled to the respective stage such as, for example, by mechanical, magnetic, fluidic or other attachment or contact directly or indirectly to or with the stage. The one or more actuators may be configured to move the stage 270 in the z-direction while maintaining the stage 270 in the same plane (e.g., maintaining a level or horizontal attitude, perpendicular to the optical axis). The one or more actuators may be configured to tilt the stage 270. This can be done, for example, so that the flow cell 225 may be leveled dynamically to account for any slope in its surfaces.

Focusing of the system 215 may refer to aligning the focal plane of the objective lens with the sample to be imaged at the chosen sample location. However, focusing may also refer to adjustments to the system 215 to obtain a desired characteristic for a representation of the sample such as, for example, a desired level of sharpness or contrast for an image of a test sample. Focus component 217 may closely follows the surface being imaged as the usable depth of field of the focal plane of the objective lens may be small (sometimes on the order of 1 m or less). As the flow cell 225 may not be perfectly flat as fixtured in the instrument, focus component 217 may be set up to follow the profile of the surface being imaged while moving along in the scanning direction (e.g., the y-axis).

The light emanating from a test sample at a sample location being imaged may be directed to one or more detectors of camera system 240. An aperture may be included and positioned to allow only light emanating from the focus area to pass to the detector. The aperture may be included to improve image quality by filtering out components of the light that emanate from areas that are outside of the focus area. Emission filters may be included in a filter switching assembly 245, which can be selected to record a determined emission wavelength and to cut out any stray laser light.

Although not illustrated, a controller can be provided to control the operation of the system 215. The controller may be implemented to control aspects of system operation such as, for example, focusing, stage movement, and imaging operations. In one or more cases, the controller may be implemented using hardware, processes (e.g., machine executable instructions), or a combination of the foregoing. For example, the controller may include one or more CPUs or processors with associated memory. In another example, the controller includes hardware or other circuitry to control the operation, such as a computer processor and a non-transitory computer readable medium with machine-readable instructions stored thereon. For example, the hardware or other circuitry may include one or more of the following:

field programmable gate array (FPGA), application specific integrated circuit (ASIC), programmable logic device (PLD), complex programmable logic device (CPLD), a programmable logic array (PLA), programmable array logic (PAL) or other similar processing device or circuitry. As yet another example, the controller may include a combination of this circuitry with one or more processors.

In one or more cases, the flow cell 225 may be read from at least one side (i.e., top and/or bottom sides). As such, the multiple readers or imaging systems may be used to read signals emanating from the channels of the flow cell 225. The flow cell 225 may include one or more complementary metal oxide semiconductor (CMOS) sensors that may be implemented instead of, or in addition to, external cameras and/or optics in the camera system 240.

The sequencing device 214 may include an access subsystem configured to move cartridges (e.g., from a receiving position to an engaged position) and/or actuate doors (e.g., to open and close) to provide access to cartridge holders. The cartridges may include one or more flow cells, fluids, reagents, or other materials for being loaded into the sequencing device 214. The sequencing device 214 may include a status subsystem that includes light bars that provide a visual indication through color changes and/or intensity changes of the status of one or more processes being performed on the sequencing device 214.

Each of the subsystems on the sequencing device may be powered by power resources controlled by a power subsystem. The power subsystem may include a power source, such as such as an alternating-current (AC) power source or direct current (DC) power source. The power resources may be controlled by one or more applications for performing different tasks in a sequencing process. The power source may generate a supply voltage for powering the subsystems within the sequencing device 214.

In one or more cases, the system 215 (e.g., a detector subsystem) may obtain a target image of an object (e.g., the flow cell 225), in which the image includes a repeating pattern of features on the object and at least one fiducial also on the object. In one or more cases, the system 215 may be configured to capture high resolution imaging of surfaces of a substrate (e.g., a flow cell). The system 215 may have sufficient resolution to distinguish features at the densities, pitches and/or feature sizes. The system 215 may be configured to maintain an object and detector in a static relationship while obtaining an area image. In one or more cases, the camera system 240 of the system 215 may comprise a scanning apparatus used to obtain an image. For example, the scanning apparatus (e.g., 'step and shoot' detectors) may obtain sequential area images. In one or more other cases, the scanning apparatus may be configured to continually scan a point or line over the surface of an object to accumulate data to construct an image of the surface. Such scanning apparatus (e.g., a point scanning detector) may be configured to scan a point (i.e., a small detection area) over the surface of an object via a raster motion in the X-Y plane of the surface. In one or more other cases, the scanning apparatus (e.g., a line scanning detector) may employ confocal line scanning to produce progressive pixilated image data that can be analyzed to locate individual features/fiducials in an array. In some cases, the scanning apparatus (e.g., a line scanning detector) may be configured to scan a line along the Y dimension of the surface of an object, which is the longest dimension of the line occurring along the X dimension. It is noted that the system 215, object or both can be moved to achieve scanning detection. The system 215, for example, those used in nucleic acid sequencing applications, are described in US Pat App. Pub. Nos. 2012/0270305 A1; 2013/0023422 A1; and 2013/0260372 A1; and U.S. Pat. Nos. 8,158,926 and 8,241,573, each of which is incorporated herein by reference. It is noted that the processes described herein may be used to analyze collected image data for multiple swaths or regions detected in regions of a sample flow cell as described herein. However, it should be understood that the processes described herein may also be used for analyzing collected image data for other types of substrates containing arrays of molecules or other detectable features.

In one or more cases, the system 215 may be configured to generate image data representative of individual features/fiducials on the flow cell, as well as spaces between features/fiducials, and representations of fiducials provided in or on the flow cell. The sequencing system 204 may receive the image data and processes the image data in accordance with the present disclosure, to extract meaningful values from the imaging data as described herein. In one or more cases, the sequencing system 204 may process image data in real or near-real time while one or more sets of image data of the flow cell is being obtained. Such real time analysis is useful for nucleic acid sequencing applications in which an array of nucleic acids is subjected to repeated cycles of fluidic and detection operations. Analysis of the sequencing data may be computationally intensive such that it is beneficial to perform the processes in real or near-real time or in the background while other data acquisition or analysis are in process. Example real time analysis methods that can be used with the present methods are those used for the MiSeq™ and HiSeq™ sequencing devices commercially available from Illumina, Inc. and/or described in U.S. Pat. App. Pub. No. 2012/0020537 A1, which is incorporated herein by reference in its entirety. The terms "real time" and "near-real time", when used in conjunction with the processing of samples and their imaging are intended to imply that the processing occurs at least in part during the time the samples are being processed and imaged. In other examples, image data may be obtained and stored for subsequent analysis by similar processes. This may permit other equipment (e.g., powerful processing systems) to handle the processing tasks at the same or a different physical site from where imaging is performed. This may also allow for re-processing, quality verification, and so forth.

The sequencing system 204 may analyze the image data to determine the locations of individual features, visible or encoded in the image data, as well as locations in which no feature is visible (i.e., where there is no feature, or where no meaningful radiation was detected from an existing feature). Image data analysis may also be used to determine locations of fiducials that aid in locating the features. Still further, image data analysis may be used for locating the patterned array in the system, for providing useful information for processing or reference purposes, and so forth.

In one or more cases, the sequencing system 204 may be configured to assign an intensity and/or a digital value to each feature and/or fiducial based upon characteristics of the image data represented by pixels at the corresponding location. That is, for example, the sequencing system 204 may be configured to recognize that a specific color (e.g., black, white, etc.) or wavelength of light detected at a specific location, as indicated by a group or cluster of pixels at the location. For example, in a DNA imaging application, the four common nucleotides may be represented by separate and distinguishable colors (or more generally, wavelengths or wavelength ranges of light). The sequencing system 204 may assign each color an intensity and/or digital value corresponding to that nucleotide. The sequencing system 204 assigns the corresponding value to the feature, alleviating the need to further process the image data itself, which may be more voluminous (e.g., many pixels may correspond to each feature) and have significantly larger numerical values (i.e., a larger number of bits to encode each pixel). In one or more cases, the sequencing system 204 may associate each of the assigned intensities and/or digital values with a location in an image index or map, which, may be made by reference to known or detected locations of fiducials, or to any data encoded by such fiducials. The map may correspond to the known or determined locations of individual features within an array.

As discussed herein, the sequencing device 214 may be used for SBS. In SBS, fluorescently labeled modified nucleotides may be used to sequence dense clusters of amplified DNA (i.e., possibly millions of clusters) present on the surface of a substrate (e.g., a flow cell). The flow cells containing the nucleic acid samples for sequencing may take the form of arrays of discrete, separately detectable single molecules, or arrays of features (or clusters) containing homogeneous populations of particular molecular species, such as amplified nucleic acids having a common sequence.

Figure 2C:
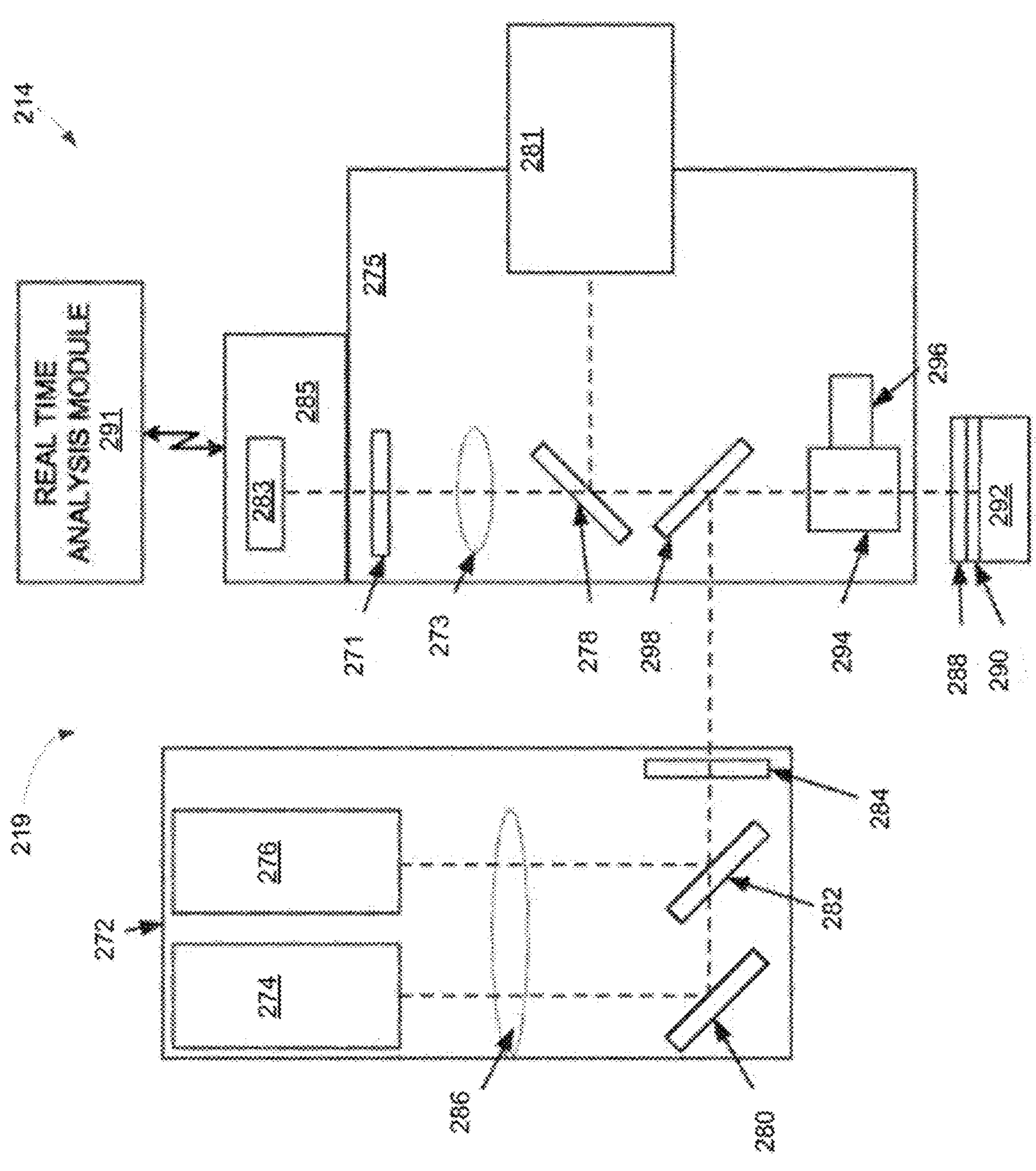
FIG. 2C illustrates an example line-scanning imaging system.

FIG. 2C illustrates an example line-scanning imaging system 219. For example, system 219 may be a two-channel, line-scanning modular optical imaging system. It is noted that although system 219 is described as a two-channel, line-scanning modular optical imaging system, it should be understood that system 219 may be configured to utilize any number of channels (e.g., one channel, three channels, four channels, and the like).

In one or more cases, system 219 may be used for the sequencing of nucleic acids. Applicable techniques include those in which nucleic acids are attached at fixed locations in an array (e.g., the wells of a flow cell) and the array is imaged repeatedly. System 219 may obtain images in two different color channels, which may be used to distinguish a particular nucleotide base type from another. For instance, system 219 may implement a process referred to as "base calling," which generally refers to a process of a determining a base call (e.g., adenine (A), cytosine (C), guanine (G), or thymine (T)) for a given spot location of an image at an imaging cycle. During two-channel base calling, image data extracted from two images may be used to determine the presence of one of four base types by encoding base identity as a combination of the intensities of the two images. For a given spot or location in each of the two images, base identity may be determined based on whether the combination of signal identities is [on, on], [on, off], [off, on], or [off, off].

The system 219 may include a line generation module (LGM) 272 with at least one light source, such as, but not limited to, light sources, 274 and 276. A light source, such as, light sources 274 and 276, may be a coherent light source, such as, but not limited to, laser diodes that output laser beams. Light source 274 may emit light in a first wavelength (e.g., a red color wavelength), and light source 276 may emit light in a second wavelength (e.g., a green color wavelength). The light beams output from laser sources 274 and 276 may be directed through a beam shaping lens or lenses 286. In some cases, a single light shaping lens may be used to shape the light beams output from both light sources. In other cases, a separate beam shaping lens may be used for each light beam. In some examples, the beam shaping lens is, for example, but not limited to, a Powell lens, such that the light beams are shaped into line patterns. The beam shaping lenses of LGM 272 or other optical components imaging system 219 may be configured to shape the light emitted by light sources 274 and 276 into a line patterns (e.g., by using one or more Powel lenses, or other beam shaping lenses, diffractive or scattering components).

LGM 272 may further include mirror 280 and semi-reflective mirror 282 configured to direct the light beams through a single interface port to an emission optics module (EOM) 275. The light beams may pass through a shutter element 284. EOM 275 may include objective lens 298 and a z-stage 296 which moves objective lens 298 longitudinally closer to or further away from a target 292. For example, target 292 may include a liquid layer 290 and a translucent cover plate 288, and a biological sample may be located at an inside surface of the translucent cover plate 288 as well an inside surface of the substrate layer located below the liquid layer. The z-stage may then move the objective lens 298 to focus the light beams onto either side surface of the flow cell (e.g., focused on the biological sample). The biological sample may be, for example, but not limited to, DNA, RNA, proteins, or other biological materials responsive to optical sequencing.

EOM 275 may include semi-reflective mirror 278 to reflect a focus tracking light beam emitted from a focus tracking module (FTM) 281 onto target 292, and to reflect light returned from target 292 back into FTM 281. FTM 281 may include a focus tracking optical sensor to detect characteristics of the returned focus tracking light beam and generate a feedback signal to optimize focus of objective 298 on target 292.

EOM 275 may also include semi-reflective mirror 298 to direct light through objective 298, while allowing light returned from target 292 to pass through. In some cases, EOM 275 may include a tube lens 273. Light transmitted through tube lens 273 may pass through filter element 271 and into camera module (CAM) 285. CAM 285 may include one or more optical sensors 283 to detect light emitted from the biological sample in response to the incident light beams (e.g., fluorescence in response to red and green light received from light sources 274 and 276).

Output data from the sensors of CAM 285 may be communicated to a real time analysis module 291. Real time analysis module 291 may execute computer readable instructions to analyze the image data (e.g., quality scoring, base calling, etc.). These operations may be performed in real-time during imaging cycles to minimize downstream analysis time and provide real time feedback and troubleshooting during an imaging run. In one or more cases, the real time analysis 291 module may be a computing device (e.g., computing device 800) that is communicatively coupled to and controls imaging system 219. In one or more cases, real time analysis module 291 may execute computer readable instructions for correcting distortion in the image data.

As discussed herein, image distortion may be particularly detrimental for multi-cycle imaging of a patterned array (e.g., a patterned flow cell), as the image distortion may shift the actual position of features of the scanned image away from the expected position of the features. This distortion effect may become particularly pronounced along the edges of the field of view, potentially rendering unusable the imaged data from these features. This may cause a drop in data throughput and an increase in error rate during a multi-cycle imaging run. Further, during cycles of an imaging run, high frequency motion of the stage (i.e., jitter) exacerbates this distortion effect. Implementations described herein are directed to dynamically correcting image distortion during an imaging run (e.g., a sequencing run), thereby improving data throughput and reducing the error rate during the imaging run.

Figure 3:
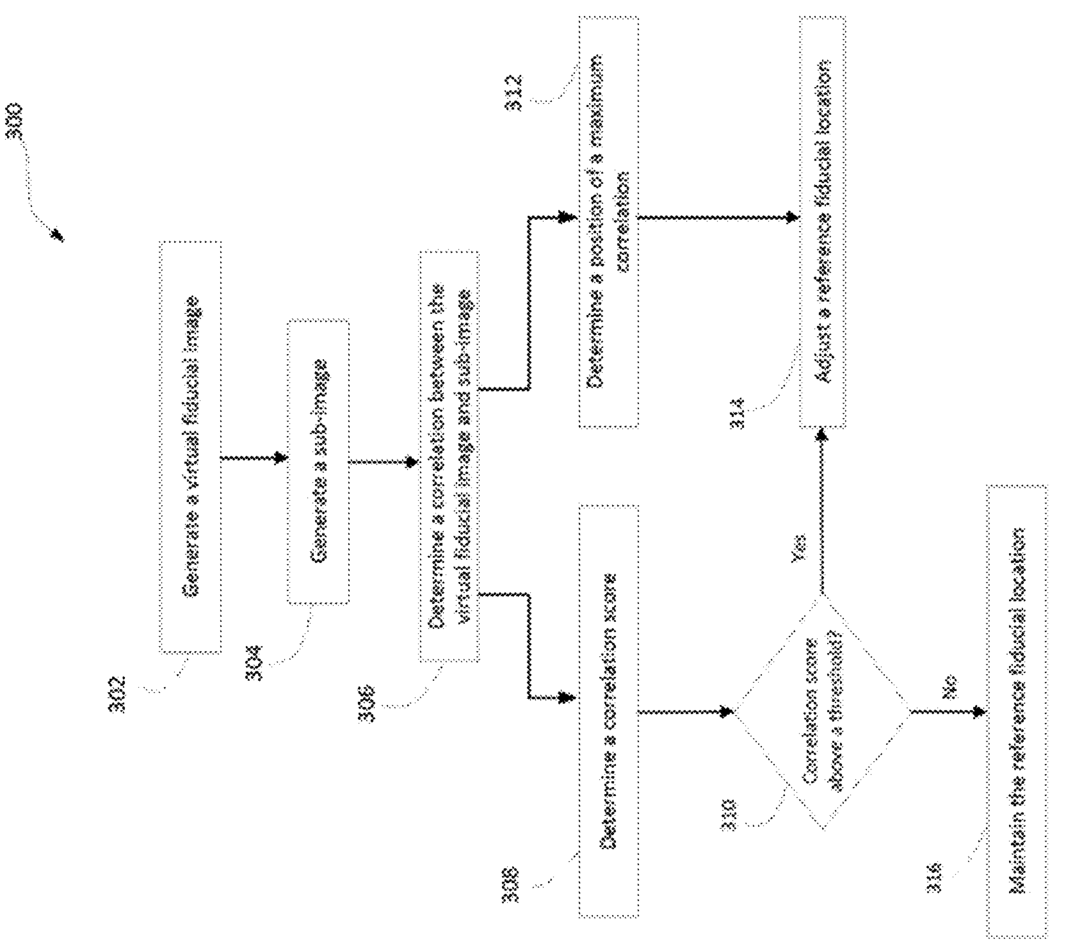
FIG. 3 is a flowchart that illustrates an example image calibration process

FIG. 3 is a flowchart that illustrates a procedure 300 for performing an example image calibration process. In one or more cases, the sequencing device 214 may implement procedure 300, as illustrated in FIG. 3, to determine a location of a reference fiducial. The one or more portions of the procedure 300 may be performed by one or more computing devices. For example, the one or more portions of the procedure 300 may be performed by one or more sequencing devices. One or more portions of the procedure 300 may be stored in memory as computer-readable or machine-readable instructions that may be executed by a processor of the one or more computing devices. Though portions of the procedure 300 may be described herein as being performed by a sequencing device, the procedure 300, or portions thereof (e.g., detector subsystem 215 or imaging system 219), may be performed by another computing device or distributed across multiple computing devices, such as one or more sequencing devices, one or more client devices and/or one or more server devices.

The procedure 300 may begin at 302. As shown in FIG. 3, at 302 the sequencing device 214 may generate a virtual fiducial image. To generate the virtual fiducial image, the sequencing device 214 may capture an image of a sample (e.g., a sample located on a flow cell as described herein) in an initial imaging cycle. In one or more cases, the initial imaging cycle may be a calibration cycle and the first cycle of a multi-cycle imaging run (e.g., a DNA sequencing run). The captured image may include image data corresponding to at least one feature and a plurality of fiducials.

In some cases, the virtual fiducial image may include the plurality of fiducials arranged in a pattern. For example, the virtual fiducial image (e.g., sequencing image 102 of FIG. 1A) may be a sequencing image that includes two sets of fiducials (e.g., set 108*a* and set 108*b*) that are linearly arranged in a parallel or substantially parallel direction with one another. In an example, a set of fiducials (e.g., set of fiducials 108*a*) may include four fiducials, and another set of fiducials (e.g., ser of fiducials 108*b*) may include four fiducials. In some examples, a fiducial from one set of fiducials (e.g., fiducial 106*a*) may be aligned (e.g., horizontally) with a fiducial from the other set of fiducials (e.g., 106*b*). As noted herein, the fiducials are included in the object (e.g., a flow cell) or an image (e.g., sequencing image 102 of FIG. 1A) to facilitate the identification and localization of individual features. One or more fiducials provide a point of reference for relative locations of features associated with the object or image. For example, a feature positioned within an area of a fiducial may be associated with that fiducial. In another example, a feature that is located in a vicinity of one or more fiducials (i.e., the fiducials that are nearest to the feature) may be associated with these fiducials. Although, the procedure 300 described herein may be implemented using the example arrangement 101 of the sequencing image 102, it should be noted that the procedure 300 may be similarly implemented using the example arrangements 103, 105, and other fiducial arrangements.

A sequencing device 214 may obtain the virtual fiducial image, via for example, but not limited to system 215 or the imaging system 219, as described herein. The virtual fiducial image includes a repeating pattern of features on the object and at least one fiducial also on the object. In one or more cases, the sequencing system 204 may process image data in real or near-real time while one or more sets of image data of the flow cell is being obtained.

The sequencing device 214 may generate the virtual fiducial image based on fiducial configuration parameters. Fiducial configuration parameters may be parameters that describe a shape and size of a fiducial. For example, with respect to a bulls-eye type fiducial, such as fiducial 106*a* of FIG. 1A, configuration parameters of the fiducial 106*a* may include the diameters of the outer and inner circles that form the fiducial 106*a*.

In one or more cases, based on the image data and/or fiducial configuration parameters, the sequencing device 214 may associate one of the fiducials (e.g., fiducial 106*a*) as a reference fiducial (e.g., reference fiducial 404 illustrated in FIG. 4A). The sequencing device 214 may utilize the reference fiducial to locate one or more fiducials associated with the virtual fiducial image. In one or more cases, the reference fiducial is a global reference point that the sequencing device 214 utilizes to locate and/or register other fiducials within the image.

At 304, the sequencing device 214 generates a sub-image of the virtual fiducial image with a larger padding (e.g., but not limited to, a padding that is two times larger than an overall size/area of the fiducial). To ensure that a fiducial is located during a search (i.e., a fiducial does not move more than a certain number of pixels, such as, but not limited to, 20 pixels), the sequencing device 214 may generate the sub-image to have a padding of, for example, 20 pixels in diameter larger than the diameter of the fiducial within the virtual fiducial image. Based on the fiducial configuration parameters, the sequencing device 214 generates the sub-image such that the sub-image is centered or substantially centered over the fiducial (i.e., reference fiducial) of the virtual fiducial image. In an example, the reference fiducial may be the upper left fiducial within the virtual fiducial image. In some cases, the reference fiducial may be a reference fiducial for every tile within the virtual fiducial image. In other cases, the reference fiducial may be a reference fiducial for a respective tile within the virtual fiducial image.

Having obtained the virtual fiducial image and the sub-image, the sequencing device 214 determines a correlation between the virtual fiducial image and the sub-image at 306 to locate fiducials within various regions of the image. For example, the sequencing device 214 may implement a template matching process and/or an image matching process using the image data and the reference fiducial as a point (e.g., a unique key point) within the image to locate fiducials within various regions of the image. For example, during the initial imaging cycle, the sequencing device 214 may implement a matching process to search for a reference fiducial within the image. When implementing a template matching process, the sequencing device 214 may assume the shape of the object being searched and may incorporate the assumed shape into the search for the reference fiducial. In some cases, the sequencing device 214 may implement a template matching process, such as a cross-correlation process. The cross-correlation process may be, for example, but not limited to, a Fast Fourier Transform (FFT)-based cross-correlation process, to locate the object within a pixel. The sequencing device 214 may fit a two-dimensional Gaussian function to the resulting correlation peak of the FFT-based cross-correlation process to fit the object to a sub-pixel accuracy. As such, the sequencing device 214 may locate each fiducial in the image to a sub-pixel accuracy. That is, the sequencing device 214 may apply a FFT to a location of the reference fiducial within the virtual fiducial image with a portion of the sub-image containing, for example, the upper left fiducial. In some other cases, the sequencing device 214 may locate the reference fiducial and other fiducials within an image using one or more of key point detection processes, a Harris Detector, Scale-Invariant Feature Transform (SIFT), or other like processes. The template matching process may utilize a template that includes information indicating the relative positions of the fiducials. The template may represent the known, actual positions of the fiducials. By using the template, the fiducials within the image can be located with respect to a located reference fiducial even if there are some errors introduced in the image for one or more fiducial locations.

As described herein, the sequencing device 214 may be configured to assign a digital value to each fiducial based upon characteristics of the image data represented by pixels at the corresponding location. The sequencing device 214 assigns the corresponding value to the fiducial, alleviating the need to further process the image data itself. In one or more cases, the sequencing device 214 may associate each of the assigned values with a location in an image index or map, which, may be made by reference to known or detected locations of fiducials, or to any data encoded by such fiducials.

In one or more cases, the sequencing device 214 may determine a correlation score at 308. The correlation score may be a measure of how strong the best correlation between the virtual fiducial image and the sub-image is relative to the second-best correlation between the virtual fiducial image and the sub-image. The correlation score may be a result of an output from the cross-correlation process. For instance, in some cases, the output of the cross-correlation process may be graphically illustrated to indicate whether a fiducial is located within an image and/or a location of a fiducial. The output of the cross-correlation process for a fiducial associated with the two images, such as the virtual fiducial image and the sub-image, may be illustrated as a single peak. The location of the peak may indicate the location of the fiducial in the real image. Further, by locating the peak, it may be assumed that the fiducial in the virtual image is located at the center of the virtual image.

The sequencing device 214 may use the correlation score to determine whether the peak of the correlation process is the maximum peak. For example, the sequencing device 214 may locate the highest peak in the output of the cross-correlation process. The location of the highest peak may be recorded as the maximum peak. Further, the sequencing device 214 locates the second highest peak in the output of the cross-correlation process and records the corresponding location as the second highest peak. In some cases, the sequencing device 114 may include a zone around the location of the highest peak (i.e., the maximum peak), in which pixels within the zone are excluded from the area that is searched to locate the second highest peak. The sequencing device 114 may search for the second highest peak in a location outside of the zone. In one or more cases, the sequencing device 114 may determine whether the location of second highest peak is the same as the location of the maximum peak. For the cases in which the locations of the second highest peak and the maximum peak are the same, the sequencing device 114 determines that there is not a peak and outputs a correlation score of 0. For the cases in which the locations of second highest peak and the maximum peak are different, the sequencing device 114 generates a correlation score indicating the correlation between the maximum peak and the second highest peak.

In one or more cases, the sequencing device 214 determines at 310 whether the correlation score is above a threshold. The threshold may be, for example, but not limited to, any numerical value (e.g., a threshold score of 0.3) that may be associated with the correlation score to indicate a confidence that a fiducial (e.g., image data of the fiducial) is located within the virtual fiducial image and/or the sub-image. For the cases in which the correlation score is not greater than a threshold score (310:NO), the sequencing device 214 may determine and maintain the location of the reference fiducial at 316. As such, the sequencing device 214 does not change the location of the reference fiducial that is indicated by the configuration parameters.

Referring to 312 of FIG. 3, the sequencing device 214 may also determine a position of maximum correlation based on a determination of a correlation between the virtual fiducial image and sub-image at 306. The position (i.e., a translation) of maximum correlation between the virtual fiducial image and sub-image may be based on the result of the output from the cross-correlation process. For the cases in which the correlation score is greater than a threshold score (310:YES), the sequencing device 214 adjusts the location of the reference fiducial at 314. In one or more cases, the sequencing device 214 adjusts the location of the reference fiducial to match the position of the maximum correlation. Further, the sequencing device 214 may adjust the location of the reference fiducial by adjusting the configuration parameters indicating the location of the reference fiducial to parameters corresponding to the location of the position of maximum correlation.

Based on the determined location of the reference fiducial (e.g., either the adjusted reference fiducial location at 314 or the maintained reference fiducial location at 316), the sequencing device 214 determines and registers the corresponding locations of the fiducials included in the image and/or tile. For example, the sequencing device 214 locates one or more other peaks in the output of the cross-correlation process. The sequencing device 214 searches for the one or more peaks in locations outside the excluded zone of the maximum peak. The sequencing device 214 compares a located peak with the maximum peak and generates a registration score to indicate whether a fiducial is located within the virtual fiducial image and/or the sub-image. Further, based on the located peak and the determined location of the reference fiducial, the sequencing device 214 associates the located peak with a location of a fiducial within the virtual fiducial image and/or the sub-image. The location and associated registration score of the respective fiducials (i.e., the fiducial configuration parameters) may be stored in a database, such as database 216.

In one or more cases, the sequencing device 214 may divide the image data obtained in the initial imaging cycle into a plurality of imaging data subsets (e.g., tiles) corresponding to a respective region of the patterned sample. That is, an imaging data subset may comprise a subset of the pixels of an imaging data set of one imaging cycle. As indicated herein, for simplicity, example images 101, 103, and 105 are illustrated in FIGS. 1A-1C in view of one tile (e.g., tiles 102, 104, and 122, respectively). Dividing the image data into a plurality of tiles permits parallelization of image processing operations. In one or more cases, the size of the imaging data subsets may be determined using the placement of fiducials in the field of view of the imaging system, in the sample, or on the sample. The imaging data subsets may be divided such that the pixels of each imaging data subset or tile have a predetermined number of fiducials (e.g., at least three fiducials, four fiducials, six fiducials, eight fiducials, etc.). For example, the total number of pixels of the imaging data subset may be predetermined based on predetermined pixel distances between the boundaries of the imaging data subset and the fiducials. In another example, for the initial imaging cycle, the imaging data subsets may be divided such that a size of the imaging data subset is not larger than half the distance between two fiducials.

Figure 4:
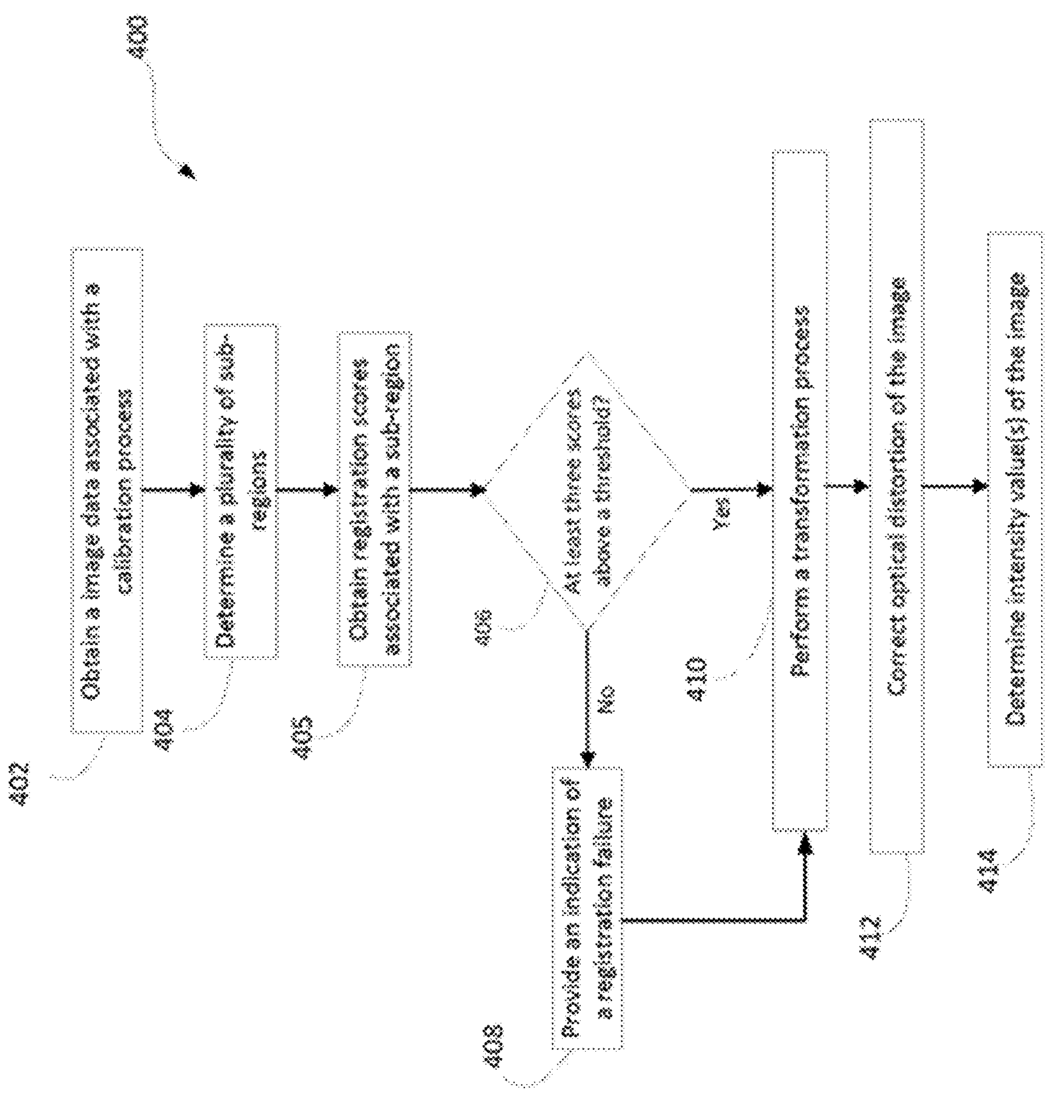
FIG. 4 is a flowchart that illustrates a performance of an example imaging process to correct jitter.

FIG. 4 is a flowchart that illustrates a procedure 400 for performing an example image distortion correction process. The one or more portions of the procedure 400 may be performed by one or more computing devices. For example, the one or more portions of the procedure 400 may be performed by one or more sequencing devices. One or more portions of the procedure 400 may be stored in memory as computer-readable or machine-readable instructions that may be executed by a processor of the one or more computing devices. Though portions of the procedure 400 may be described herein as being performed by a sequencing device, the procedure 400, or portions thereof (e.g., system 215 or imaging system 219), may be performed by another computing device or distributed across multiple computing devices, such as one or more sequencing devices, one or more client devices and/or one or more server devices.

The procedure 400 may begin at 402. As shown in FIG. 4, at 402 the sequencing device 214 may obtain image data associated with a calibration process. In one or more cases, the image data may comprise fiducial configuration parameters (e.g., location of the fiducials determined during a calibration process, such as the process described in procedure 300). Additionally or alternatively, the image data may comprise sub-region parameters that define one or more subsets of the fiducials included in the image and/or tile.

Figures 5A, 5B:
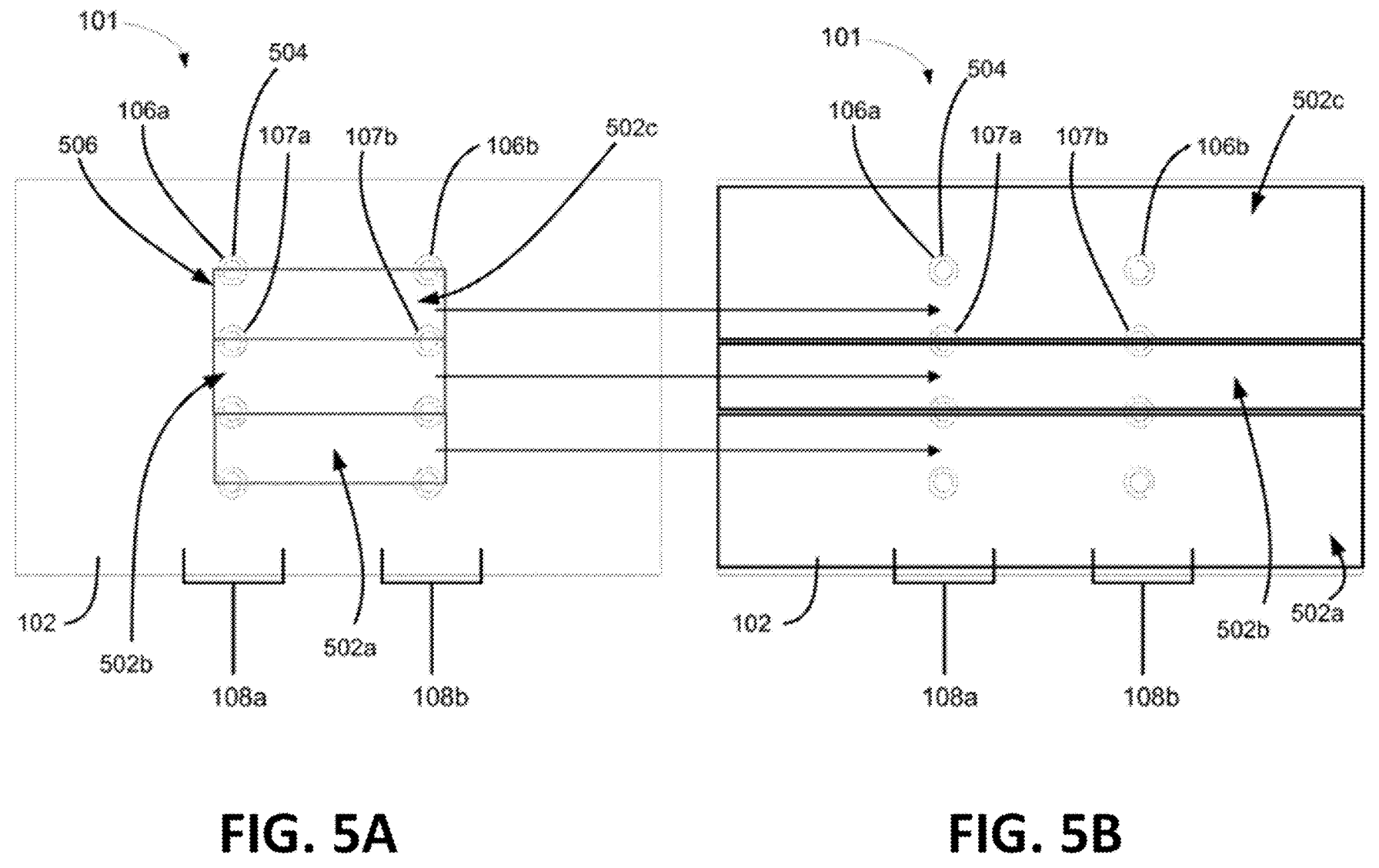

The sequencing device 214 may determine a plurality of sub-regions at 404. In one or more cases, each sub-region may include a subset of the fiducials included in the image and/or tile. For example, as illustrated in FIG. 5A, tile 102 includes sub-region 502*a*, 502*b*, and 502*c*. In one or more cases, the sequencing device 214 determines a plurality of sub-regions based on fiducial configuration parameters and sub-region parameters.

Figure 6A:
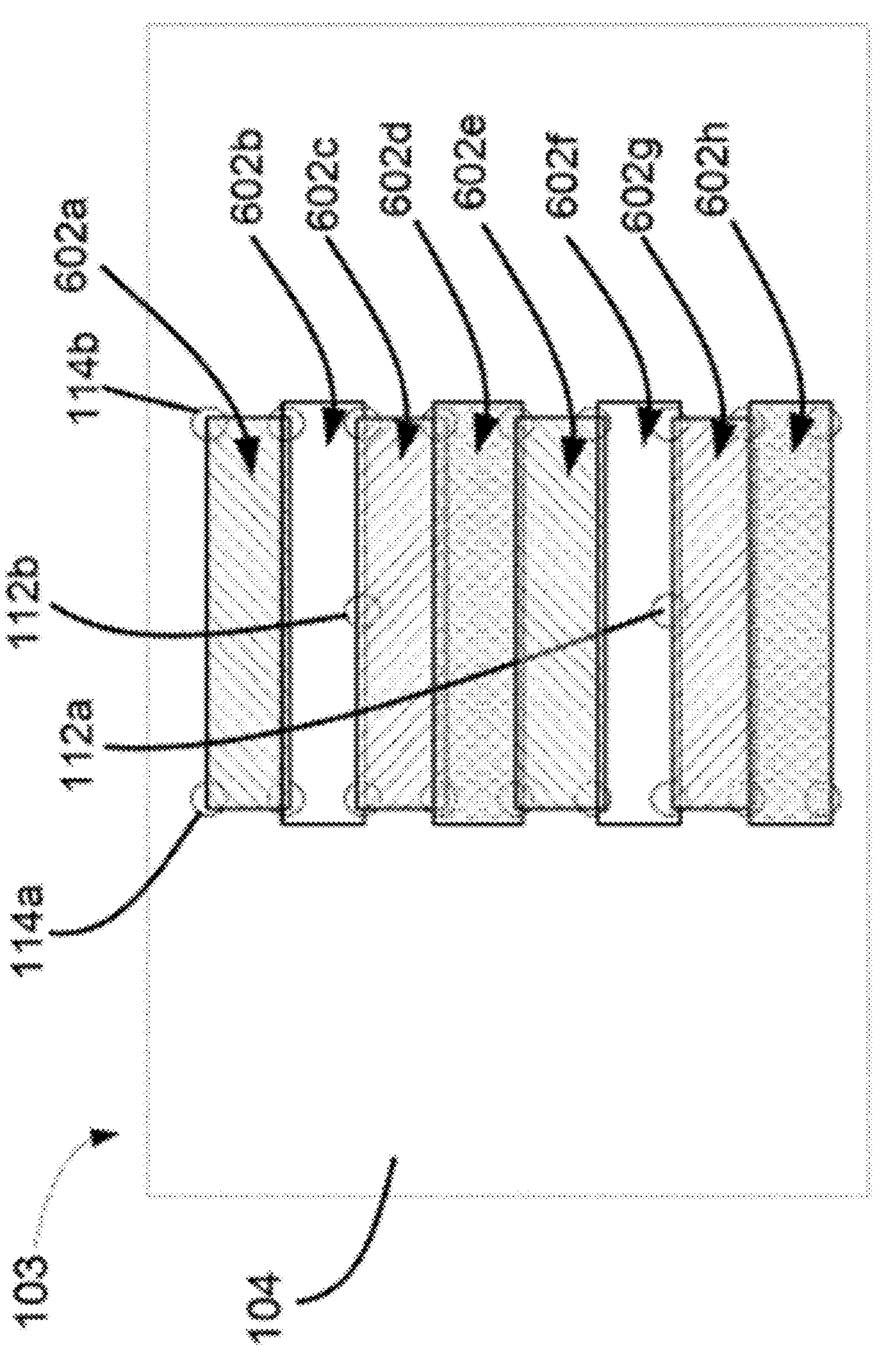
FIGS. 6A and 6B illustrate example imaging data subsets.
Figure 6A:
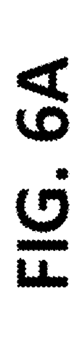
Figure 6B:
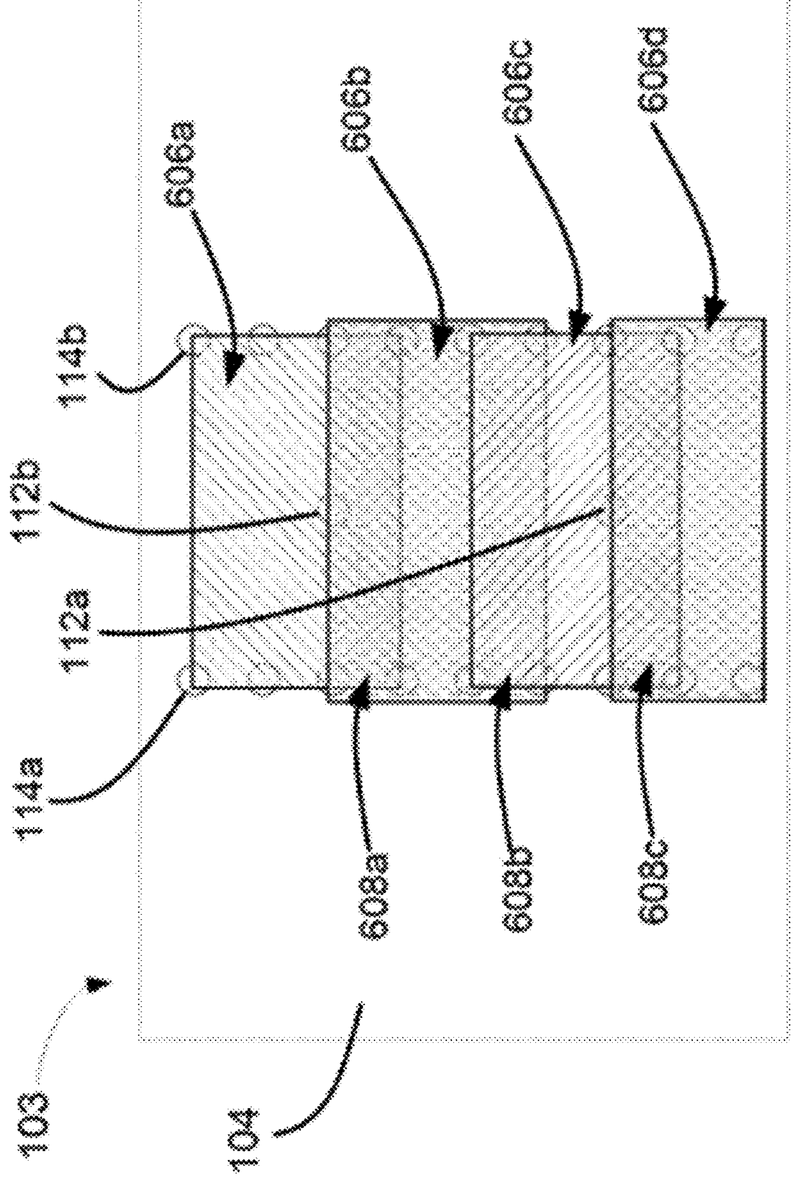

Sub-region parameters may be based on one or both of the number of fiducial rows per sub-region and the number of fiducial rows overlapped between consecutive sub-regions. For example, as illustrated in FIG. 5A, the tile 101 of image 102 may include two rows per subregion, and one row that overlaps. In another example, as illustrated in FIG. 6A, the tile 104 of image 103 may include eight sub-regions (sub-regions 602*a*, 602*b*, 602*c*, 602*d*, 602*e*, 602*f*, 602*g*, and 602*h*), in which the number of rows per region is two and the number of rows that overlap is one. In another example, as illustrated in FIG. 6B, the tile 104 of image 103 may include four sub-regions (sub-regions 606*a*, 606*b*, 606*c*, and 606*d*), in which the number of rows per region is four and the number of rows that overlap is two. The sequencing device 214 may determine and associate sets of local fiducials with the respective sub-region based on the fiducial configuration parameters and sub-region parameters. In one or more cases, the sequencing device 214 partitions locations of wells of the flow cell. For example, the sequencing device 214 partitions locations of wells by associating the locations of the wells with adjacent fiducials. Based on the association to the adjacent fiducials, the sequencing device 214 further associates the locations of the wells to the sub-regions associated with the respective fiducials. That is, the sequencing device 214 partitions the well locations and assigns the well locations to their corresponding local sub-region. For example, the sequencing device 214 may utilize an equal horizontal partitioning of the image over the sub-regions. The sequencing device 214 may assign an equal number of rows of wells for each sub-region. In some cases, the sequencing device 214 may assign the top sub-region and the bottom sub-region to include well rows near the top and bottom edges of the tile. In one or more cases, the sequencing device 214 may define a horizontal boundary of a sub-region as extending between the left and right sides of the tile, and may define vertical boundaries of the sub-regions by dividing the height of the tile by the number of subregions to be considered.

In one or more cases, the sequencing device 214 may construct the sub-regions such that the sub-regions are linearly arranged on the image. In some cases, the sequencing device 214 constructs the sub-regions, such that the sub-regions are adjacently constructed, i.e., one sub-region is adjacent to another sub-region (e.g., sub-region 502*c* is adjacent to sub-region 502*b*). In other cases, the sequencing device 214 constructs the sub-regions, such that some sub-regions are adjacently constructed and one or more sub-regions overlap one another.

In one or more cases, the sequencing device 214 may construct the sub-regions such that a fiducial may be associated with two or more sub-regions. For example, the sequencing device 214 may construct the sub-region 502*c* to be associated with fiducial 107*a* and fiducial 107*b* and may construct the sub-region 502*b* to be associated with fiducial 107*a* and fiducial 107*b*. In one or more other cases, the sequencing device 214 may construct the sub-regions such that adjacent sub-regions do not share a fiducial.

The sequencing device 214 may initialize a transformation per sub-region. The sequencing device 214 may estimate a local transformation matrix based on a plurality of parameters, which include, for example, but not limited to, translation parameters, scale parameters, and shear parameters in both the X and Y directions. For example, the sequencing device 214 may initialize a default affine transform matrix in which the coefficients for scale and shear of the default affine transform matrix may be initialized to zero, and the translation coefficient may be initialized to one for both the X and Y directions. The sequencing device 214 may construct transform matrices (e.g., Affine transform matrices) based on the locations of the fiducials. As illustrated in FIG. 5A, the sequencing device 214 constructs, for example, Affine transform matrices using locations of the fiducials that are local to a respective sub-region, such as sub-regions 502*a*, 502*b*, and 502*c* of the tile 102. That is, the sequencing device 214 constructs an affine transform matrix per sub-region using the locations of the fiducials that are associated with the respective sub-region.

In one or more cases, the sequencing device 214 constructs an affine transform matrix using at least three fiducials. For example, the sequencing device 214 constructs the sub-region 502*c* based on the locations of fiducials 106*a*, 106*b*, 107*a*, and 107*b*. In this example sub-region, the sequencing device 214 may determine that fiducials 106*a*, 106*b*, 107*a*, and 107*b* are arranged in a two-by-two pattern within sub-region 502*c*. It is noted that FIG. 5A illustrates an image and fiducials decomposed into three sub-regions. It is also understood that the image and fiducials may be decomposed into any number of sub-regions. Further, it is noted that any of a variety of geometric transformation models can be used, such as, but not limited to, linear transforms or affine transforms. The transformations can include, for example, one or more of rotation, translation, scaling, shear or the like. Having initialized an affine transform per subregion, the sequencing device 214 proceeds with iteration of the procedure 400 for each cycle per tile per sub-region.

Referring again to the procedure 400 of FIG. 4, the sequencing device 214 obtains registration scores at 405 for each fiducial location associated with a sub-region. For instance, the sequencing device 214 obtains the registration scores from a database, such as database 216. The sequencing device 214 may obtain the registration scores determined from an image calibration process, such as the process described in procedure 300. The sequencing device 214 may determine whether at least three registration scores are above a threshold score at 406.

For the cases in which the three registration scores of respective fiducial locations are not greater than the threshold score (406:NO), the sequencing device 214 provides an indication of a registration failure at 408. The sequencing device 214 provides an indication of a registration failure by associating the respective sub-region with an indication that image registration for the respective sub-region failed. For example, the sequencing device 214 may set a local failure flag for the respective tile and provide a −9999 translation. Registration failure may occur when fewer than three fiducials can be accurately found. For example, the sequencing device 214 may determine that registration failed when three scores of respective fiducial locations are not greater than the threshold score (i.e., the sequencing device 214 could not locate or accurately at least three fiducials within the respective sub-region). As such, the sequencing device 214 may determine that base calls cannot be made for the associated tile in the respective cycle. Registration failure may also occur when three fiducials are co-linear (i.e., the three fiducials are aligned in a single column or single row). For example, in some cases the sequencing device 214 may determine that the three scores of respective fiducial locations are greater than the threshold score, however, the sequencing device 214 may further determine that the locations of the fiducials are co-linear. In such cases, the sequencing device 214 provides an indication of a registration failure at 408.

For the cases in which each of the three registration scores are greater than the threshold score (406:YES), the sequencing device 214 performs a transformation process at 410. The sequencing device 214 may apply the transformation process to transform the locations of the fiducials associated with the respective sub-region. In one or more cases, the sequencing device 214 may perform the transformation process on each sub-region and fiducials having locations associated with the respective sub-region. The sequencing device 214 performs the transformation process to generate a respective local transform associated with each sub-region (i.e., the transformed locations of the fiducials associated with the respective sub-region). For example, the sequencing device 214 may apply the transformation process (e.g., an Affine transformation) to sub-region 502*c* and the locations of fiducials 106*a*, 106*b*, 107*a*, and 107*b* to generate the local transformed locations of fiducials 106*a*, 106*b*, 107*a*, and 107*b* associated with sub-region 502*c*, as illustrated in FIG. 5B.

The sequencing device 214 may correct optical distortion of the image at 412. For example, to correct optical distortion of the image, the sequencing device 214 applies a non-linear distortion process to each fiducial location within the image. The sequencing device 214 may determine intensity value(s), for example, pixel intensity value(s), of the image at 414. In one or more cases, the sequencing device 214 may determine the intensity value(s) of the image by sharpening the image using, for example, an adaptive equalizer. The sequencing device 214 may perform equalization by convolving the image with a channel specific mask to sharpen the image. The sequencing device 214 may apply the same masks to different sub-regions of the image. The sequencing device 214 may apply different masks to different sub-regions of the image.

To extract the intensity value(s), for example, the pixel intensity value(s), of the sharpened image at each location, the sequencing device 214 may interpolate the equalized pixel intensities in a square centered on the location. The sequencing device 214 may use an interpolate method, such as, but not limited to, a bilinear method, a hamming method, or the like, over several pixels. The sequencing device 214 may spatially normalize tile(s) of the image per sub-region. For example, the sequencing device 214 may spatially normalize tile(s) of the image per sub-region, such that the $90^{th}$ and $10^{th}$ percentiles of the extracted intensities of the normalized tile(s) are equal. The sequencing device 214 may compress the intensities, such that the 1st and $99^{th}$ percentiles of the extracted pixel intensities have a pixel intensity value of 1 and 255, respectively. The lossy compression of the intensities may decrease memory load. In one or more cases, the sequencing device 214 may store the array of pixel intensity values for the clusters within memory.

In one or more cases, the sequencing device 214 is configured to repeat procedure 400 for each tile within the image. When the cycle associated with the image is complete, the sequencing device 214 may initiate a subsequent imaging cycle for the patterned sample and generate new image data of the patterned sample. As such, the sequencing device 214 is configured to repeat procedure 400 for the new image data as described herein.

The sequencing device 214 may be configured to implement base calling to determine a base call (e.g., adenine (A), cytosine (C), guanine (G), or thymine (T)) for a given spot location of an image at an imaging cycle. For example, during two-channel base calling, the sequencing device 214 may use image data extracted from two images to determine the presence of one of four base types by encoding a base identity as a combination of the intensities of the two images. For instance, for a given spot or location in each of the two images, the sequencing device 214 may be configured to determine a base identity based on whether the combination of signal identities is [on, on], [on, off], [off, on], or [off, off].

Base calling may be performed by fitting a mathematical model to the intensity data. A mathematical model may be, for example, but not limited to, a k-means clustering algorithm, a k-means-like clustering algorithm, expectation maximization clustering algorithm, a histogram-based method, and the like. In an example, the sequencing device 214 may fit four Gaussian distributions to the set of two-channel intensity data such that one distribution is applied for each of the four nucleotides represented in the data set. In one example, the sequencing device 214 may apply an expectation maximization (EM) algorithm to the intensity data. As a result of the EM algorithm, for each X, Y value (i.e., referring to each of the two channel intensities respectively) a value can be generated that represents the likelihood that a certain X, Y intensity value belongs to one of four Gaussian distributions to which the data is fitted. For the cases in which four bases provide four separate distributions, each X, Y intensity value may also have four associated likelihood values, one for each of the four bases. The maximum of the four likelihood values indicates the base call. For example, if a cluster is "off" in both channels, the base call is G. If the cluster is "off" in one channel and "on" in another channel, the base call is either C or T (i.e., depending on which channel is "on"). If the cluster is "on" in both channels, the base call is A.

Figure 7A:
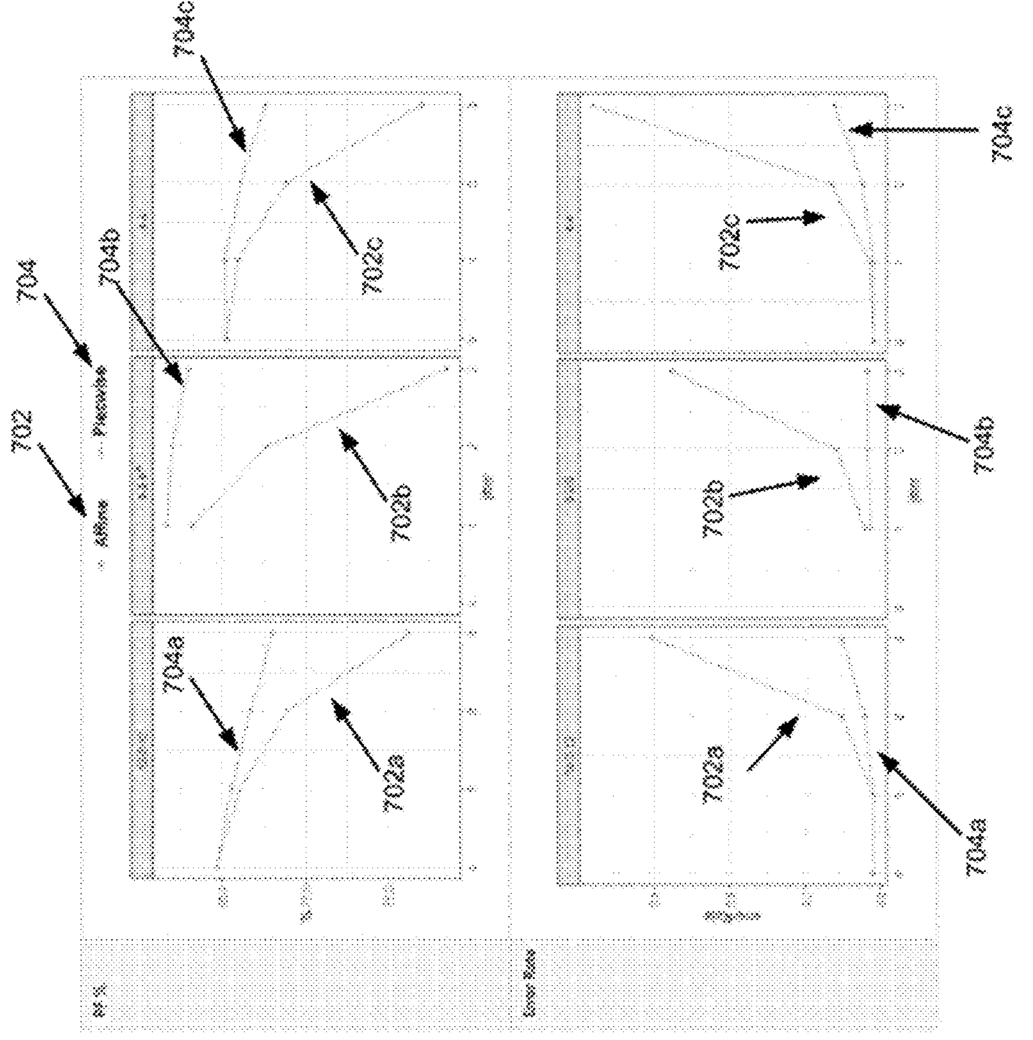

FIG. 7A illustrates simulations comparing the impact of jitter on image registration for a global Affine transformation process 702 and on image registration that utilizes the processes 704 (e.g., procedure 200), as described herein. "0" on the jitter-axis of the simulation indicates no jitter. "1" on the jitter-axis of the simulation indicates real jitter. "2" on the jitter-axis of the simulation indicates twice the jitter. "3" on the jitter-axis of the simulation indicates three times the jitter. As illustrated, the image registration processes 704*a*, 704*b*, and 704*c* (e.g., procedure 200), which utilize a 12×2×12 fiducial arrangement, a 9×2×9 fiducial arrangement, and a 4×4 fiducial arrangement, respectively, recover much of the performance loss that is demonstrated in the image registration process that utilizes the global Affine transformation process 702*a*, 702*b*, and 702*c* having the same fiducial arrangements. That is, the image registration processes 704*a*, 704*b*, and 704*c* (e.g., procedure 200) are capable of withstanding higher levels of jitter than the global Affine transformation process 702*a*, 702*b*, and 702*c*.

FIG. 7B illustrates results of real runs using a 4×4 fiducial arrangement. FIG. 7B summarizes the improvement over six runs showing a 2.7% to a 17% improvement in error rate with a mean improvement of 8%. As such, the results indicate that the 4×4 fiducial arrangement provides consistent improvement with realistic stage jitter.

Figures 7C, 7D:
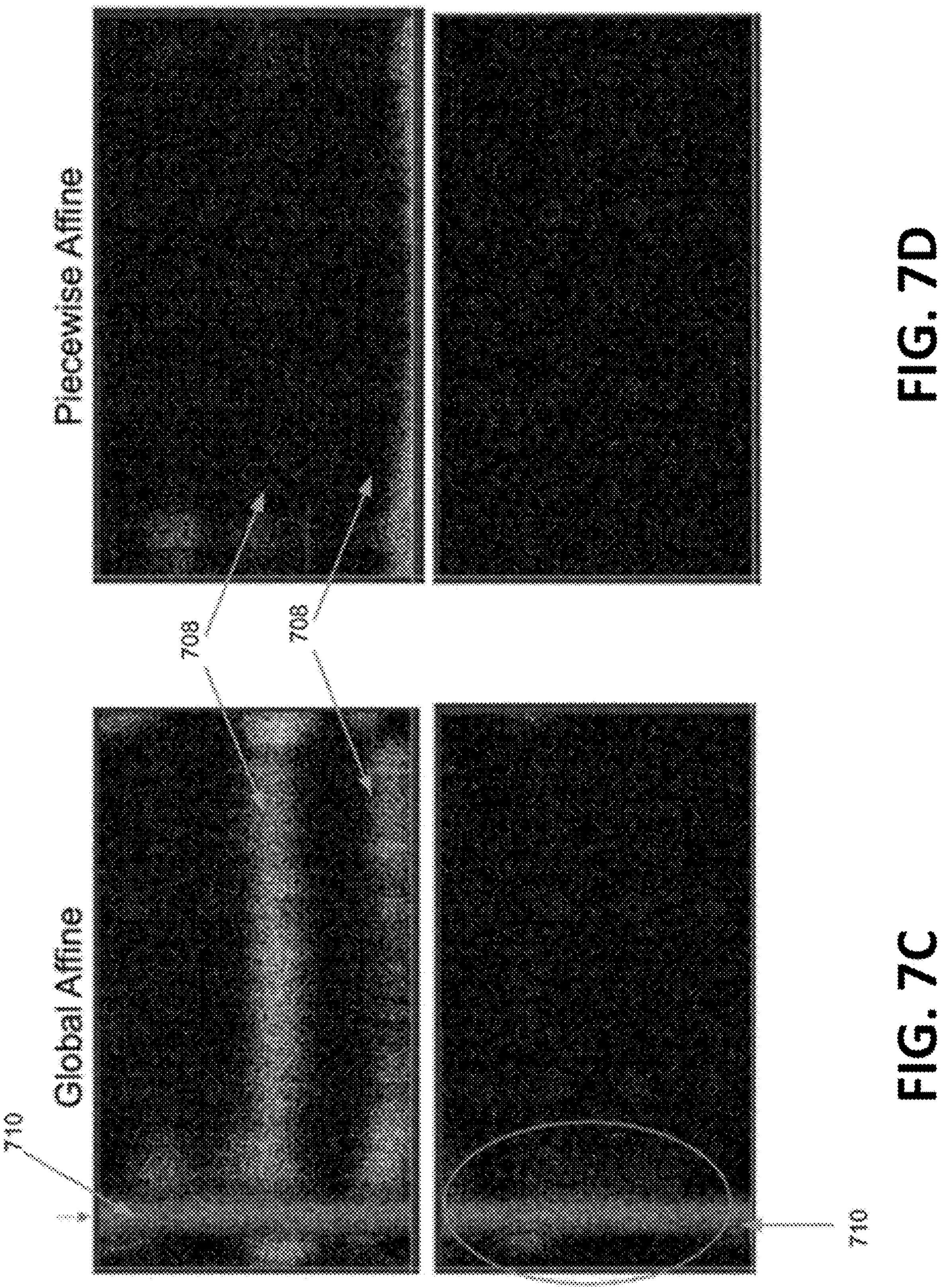

FIGS. 7C and 7D illustrates spatial representations of the error rate throughout an example sequencing image. FIG. 7C illustrates spatial representations of the error rate for a global Affine transformation process. FIG. 7D illustrates spatial representations of the error rate for the image registration that utilizes the procedure 200. Using the global Affine transformation process, FIG. 7C illustrates a period pattern in which the error rate bands 708 caused by stage jitter. However, FIG. 7D illustrates that the image registration that utilizes the procedure 200 corrects these same bands of errors. Moreover, not every tile may be impacted by error rate bands due to jitter. Some are more subtlety impacted on specific cycles causing distortion correction to break down resulting in the band 710 show in both global affine transforms on the left, but is absent from the spatial representations in FIG. 7D.

Figure 8:
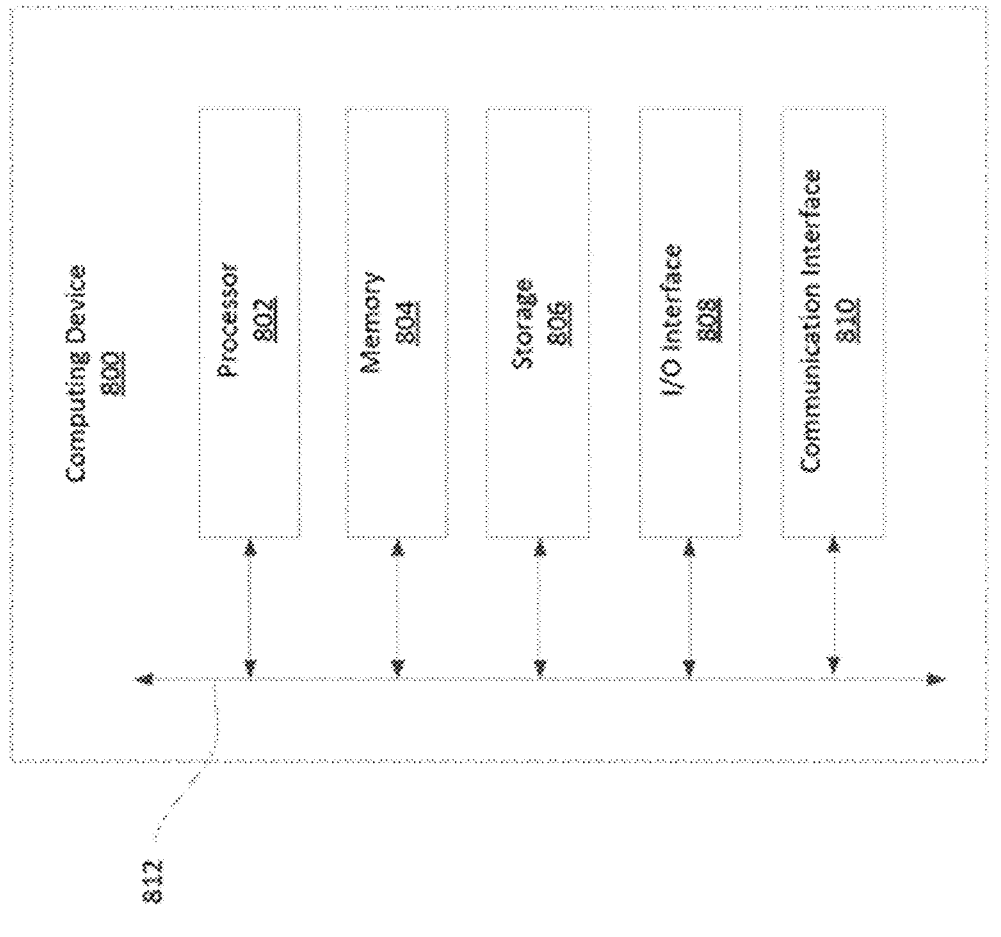
FIG. 8 is a block diagram of an example computing device.
Figure 9:
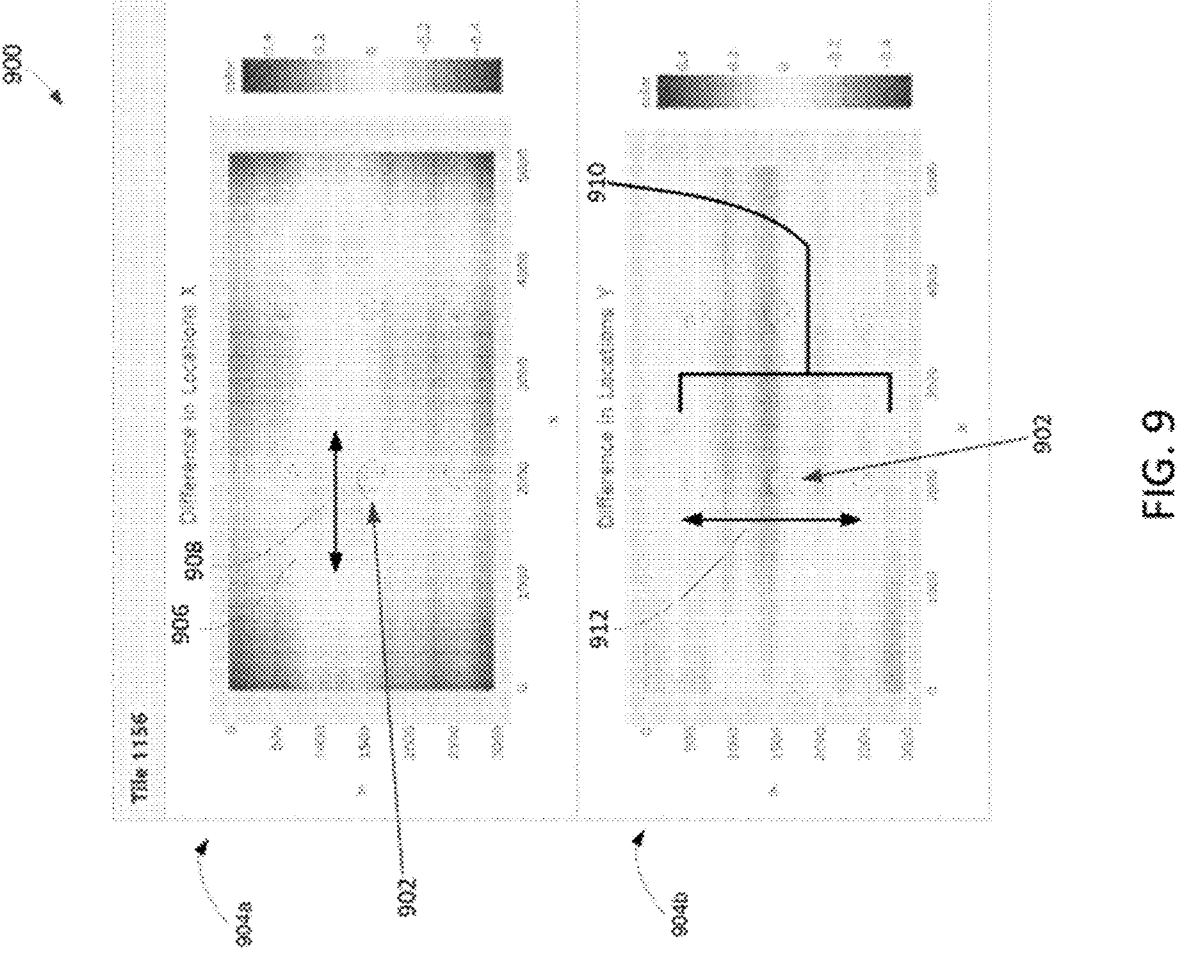
FIG. 9 is an example heatmap illustrating jitter present in both X and Y directions of a tile during a conventional imaging cycle.

FIG. 8 is a block diagram illustrating an example computing device 800. One or more computing devices such as the computing device 800 may implement one or more features for generating and/or processing sequencing tasks, as described herein. For example, the computing device 800 may comprise one or more of the sequencing device 214, the client device 208, and/or the server device(s) 202 shown in FIG. 2A. As shown by FIG. 8, the computing device 800 may comprise a processor 802, a memory 804, a storage device 806, and I/O interface 808, and/or a communication interface 810, which may be communicatively coupled by way of a communication infrastructure 812. It should be appreciated that the computing device 800 may include fewer or more components than those shown in FIG. 8.

The processor 802 may include hardware for executing instructions, such as those making up a computer program. In examples, to execute instructions for dynamically modifying workflows, the processor 802 may retrieve (or fetch) the instructions from an internal register, an internal cache, the memory 804, or the storage device 806 and decode and execute the instructions. The memory 804 may be a volatile or non-volatile memory used for storing data, metadata, computer-readable or machine-readable instructions, and/or programs for execution by the processor(s) for operating as described herein. The storage device 806 may include storage, such as a hard disk, flash disk drive, or other digital storage device, for storing data or instructions for performing the methods described herein.

The I/O interface 808 may allow a user to provide input to, receive output from, and/or otherwise transfer data to and receive data from the computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. The I/O interface 808 may be configured to provide graphical data to a display for presentation to a user. The graphical data may be representative of one or more graphical user interfaces and/or any other graphical content.

The communication interface 810 may include hardware, software, or both. In any event, the communication interface 810 may provide one or more interfaces for communication (such as, for example, packet-based communication) between the computing device 800 and one or more other computing devices or networks. The communication may be a wired or wireless communication. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the sequencing process may allow a plurality of devices (e.g., a client device, sequencing device, and server device(s)) to exchange information such as sequencing data and error notifications.

In addition to what has been described herein, the methods and systems may also be implemented in a computer program(s), software, or firmware incorporated in one or more computer-readable media for execution by a computer(s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

As used herein, the term "about" in reference to a numerical value means the numerical value itself, or the numerical value itself plus or minus 10% of the numerical value of the number with which it is being used.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A sequencing system comprising:
- a computing device comprising a processor and memory, the processor and memory configured to:
  - determine a plurality of sub-regions of an image, wherein the image comprises at least one feature and a plurality of fiducials, the plurality of fiducials are arranged in a pattern, and each sub-region comprises a subset of the fiducials comprised in the image;
  - perform a geometric transform on each sub-region to generate a respective local transform associated with each sub-region; and
  - register respective locations of the fiducials comprised in the image based on the respective local transform associated with each sub-region, wherein a size of each sub-region is selected such that each sub-region is substantially invariant to stage jitter.

2. The sequencing system of claim 1, wherein the processor and memory are configured to:
- determine a respective location for each of the fiducials in the image based on a determined location of a reference fiducial.

3. The sequencing system of claim 2, wherein the processor and memory are configured to:
- generate a sub-image based on the image, wherein the sub-image comprises a padding of pixels having a larger area than the reference fiducial comprised in the image;
- determine a correlation between the image and the sub-image; and
- determine whether to adjust a location of the reference fiducial based on the determined correlation.

4. The sequencing system of claim 1, wherein each subset of fiducials comprised in a sub-region comprises at least three fiducials.

5. The sequencing system of claim 1, wherein the sub-regions are linearly arranged with one another.

6. The sequencing system of claim 1, wherein the geometric transform comprises an affine transform.

7. A computer-implemented method comprising:
- obtaining an image comprising at least one feature and a plurality of fiducials, the plurality of fiducials being arranged in a pattern;
- determining a plurality of sub-regions of the image, wherein each sub-region comprises a subset of the fiducials comprised in the image;
- performing a geometric transform on each sub-region to generate a respective local transform associated with each sub-region; and
- registering respective locations of the fiducials comprised in the image based on the respective local transform associated with each sub-region, wherein a size of each sub-region is selected such that each sub-region is substantially invariant to stage jitter.

8. The computer-implemented method of claim 7, wherein the sub-regions are linearly arranged with one another.

9. The computer-implemented method of claim 7, wherein each subset of fiducials comprised in a sub-region comprises at least three fiducials.

10. The computer-implemented method of claim 9, wherein a reference fiducial is located within the image, wherein the method further comprises determining a respective location for each of the fiducials in the image based on a determined location of the reference fiducial.

11. The computer-implemented method of claim 10, further comprising:
- generating a sub-image based on the obtained image, wherein the sub-image comprises a padding of pixels having a larger area than the reference fiducial comprised in the image;
- determining a correlation between the obtained image and the sub-image; and
- determining whether to adjust a location of the reference fiducial based on the determined correlation.

12. The computer-implemented method of claim 7, wherein a size of each sub-region is selected such that each sub-region is substantially invariant to stage jitter of approximately 200 Hz or less.

13. The computer-implemented method of claim 7, wherein at least one fiducial is associated with two adjacent sub-regions.

14. The computer-implemented method of claim 7, wherein the pattern of the plurality of fiducials comprises a first set of linearly arranged fiducials that are adjacent to a second set of linearly arranged fiducials, the first set of linearly arranged fiducials and the second set of linearly arranged fiducials extending substantially parallel to one another.

15. The computer-implemented method of claim 7, wherein the image comprises a sequencing image.

16. The computer-implemented method of claim 7, wherein the location of the feature is associated with a well location of a flow cell.

17. The computer-implemented method of claim 7, wherein each sub-region comprises a respective feature, and the respective local transform associated with the sub-region that comprises the respective feature is used to determine the location of the respective feature.

18. A non-transitory computer readable medium comprising computer readable instructions that, when executed by a processor, cause the processor to implement a method comprising:
- obtaining an image comprising at least one feature and a plurality of fiducials, the plurality of fiducials being arranged in a pattern;
- determining a plurality of sub-regions of the image, wherein each sub-region comprises a subset of the fiducials comprised in the image;
- performing a geometric transform on each sub-region to generate a respective local transform associated with each sub-region; and
- registering respective locations of the fiducials comprised in the image based on the respective local transform associated with each sub-region, wherein a size of each sub-region is selected such that each sub-region is substantially invariant to stage jitter.

19. The non-transitory computer readable medium of claim 18 wherein the sub-regions are linearly arranged with one another.

20. The non-transitory computer readable medium of claim 18, wherein each subset of fiducials comprised in a sub-region comprises at least three fiducials.

21. The non-transitory computer readable medium of claim 18, wherein a reference fiducial is located within the image, and a location of the reference fiducial is used to determine a respective location for each of the fiducials in the image.

22. The non-transitory computer readable medium of claim 21, the method further comprising:

generating a sub-image based on the obtained image, wherein the sub-image comprises a padding of pixels having a larger area than the reference fiducial comprised in the image;

determining a correlation between the obtained image and the sub-image; and determining whether to adjust a location of the reference fiducial based on the determined correlation.

23. The non-transitory computer readable medium of claim 18, wherein a size of each sub-region is selected such that each sub-region is substantially invariant to stage jitter of approximately 200 Hz or less.

24. The non-transitory computer readable medium of claim 18, wherein at least one fiducial is associated with two adjacent sub-regions.

25. The non-transitory computer readable medium of claim 18, wherein the pattern of the plurality of fiducials comprises a first set of linearly arranged fiducials that are adjacent to a second set of linearly arranged fiducials, the first set of linearly arranged fiducials and the second set of linearly arranged fiducials extending substantially parallel to one another.

26. The non-transitory computer readable medium of claim 18, wherein the image comprises a sequencing image.

27. The non-transitory computer readable medium of claim 18, wherein the location of the feature is associated with a well location of a flow cell.

28. The non-transitory computer readable medium of claim 18, wherein each sub-region comprises a respective feature, and the respective local transform associated with the sub-region that comprises the respective feature is used to determine the location of the respective feature.

* * * * *